(12) United States Patent
Fujieda

(10) Patent No.: US 7,146,076 B2
(45) Date of Patent: Dec. 5, 2006

(54) DIFFRACTIVE OPTICAL ELEMENT AND OPTICAL DEVICE USING THE SAME

(75) Inventor: Ichiro Fujieda, Tokyo (JP)

(73) Assignee: NEC Corporation, Tokyo (JP)

( * ) Notice: Subject to any disclaimer, the term of this patent is extended or adjusted under 35 U.S.C. 154(b) by 232 days.

(21) Appl. No.: 10/201,133

(22) Filed: Jul. 24, 2002

(65) Prior Publication Data

US 2003/0021534 A1 Jan. 30, 2003

(30) Foreign Application Priority Data

Jul. 30, 2001 (JP) .............................. 2001-229082

(51) Int. Cl.
*G02B 6/34* (2006.01)

(52) U.S. Cl. ....................................................... 385/37
(58) Field of Classification Search .................... 385/1, 385/2, 4, 5, 8, 10, 31, 37, 39
See application file for complete search history.

(56) References Cited

U.S. PATENT DOCUMENTS

| | | | | |
|---|---|---|---|---|
| 4,183,630 A | * | 1/1980 | Funada et al. .............. | 349/159 |
| 5,053,765 A | * | 10/1991 | Sonehara et al. ......... | 340/815.43 |
| 5,436,758 A | * | 7/1995 | Agostinelli et al. ......... | 359/332 |
| 5,907,642 A | * | 5/1999 | Ito ................................ | 385/3 |
| 6,067,062 A | * | 5/2000 | Takasu et al. ................ | 345/87 |
| 6,108,064 A | * | 8/2000 | Minoura et al. ............. | 349/130 |
| 6,172,792 B1 | * | 1/2001 | Jepsen et al. ................ | 359/254 |
| 6,201,589 B1 | * | 3/2001 | Tombling et al. ........... | 349/141 |
| 6,339,445 B1 | * | 1/2002 | Matsuda et al. .............. | 348/42 |
| 6,388,730 B1 | * | 5/2002 | Lindquist ..................... | 349/200 |
| 6,577,376 B1 | * | 6/2003 | Shih ............................. | 349/202 |
| 2002/0063835 A1 | * | 5/2002 | Kim ............................. | 349/141 |
| 2002/0067446 A1 | * | 6/2002 | Wang ........................... | 349/113 |
| 2002/0093612 A1 | * | 7/2002 | Maruyama et al. .......... | 349/117 |

FOREIGN PATENT DOCUMENTS

| | | | |
|---|---|---|---|
| DE | 3006052 A | * | 1/1981 |
| JP | 57185017 A | * | 11/1982 |
| JP | 62079420 A | * | 4/1987 |
| JP | 01100506 A | * | 4/1989 |
| JP | 2-40615 | | 2/1990 |
| JP | 5-72509 | | 3/1993 |
| JP | 05188343 A | * | 7/1993 |

OTHER PUBLICATIONS

Jpn. J. Appl. Phys., Sakata et al., "Switchable Zero-Order Diffraction Filters Using Fine-Pitch Phase Gratings Filled With Liquid Crystals", vol. 39, 2000, pp. 1516-1521.

* cited by examiner

*Primary Examiner*—Juliana Kang
(74) *Attorney, Agent, or Firm*—Young & Thompson

(57) ABSTRACT

To provide a diffractive optical element that allows simplification of a manufacturing process and reduction in manufacturing costs. A diffractive optical element includes a first transparent substrate having a pair of transparent interdigitated electrodes facing each other formed on its surface, a second transparent substrate, and a liquid crystal sandwiched therebetween. Alignment layers are formed on surfaces of the first and second transparent substrates facing the liquid crystal. Pads are provided on the transparent electrodes and electrically connected to an outside. A seal material and a liquid crystal sealing port are provided on the first transparent substrate. The seal material is formed into a partly cut rectangle, and the liquid crystal sealing port is formed at the cut portion of the rectangular seal material.

18 Claims, 23 Drawing Sheets

11 TRANSPARENT SUBSTRATE
12 TRANSPARENT ELECTRODE
15 LIQUID CRYSTAL
16 ALIGNMENT LAYER
18 TRANSPARENT SUBSTRATE

10 DIFFRACTIVE OPTICAL ELEMENT
11 TRANSPARENT SUBSTRATE
12 TRANSPARENT ELECTRODE
13 SEAL MATERIAL
14 LIQUID CRYSTAL SEALING PORT
15 LIQUID CRYSTAL
17 PAD
18 TRANSPARENT SUBSTRATE

11 TRANSPARENT SUBSTRATE
12 TRANSPARENT ELECTRODE
15 LIQUID CRYSTAL
16 ALIGNMENT LAYER
18 TRANSPARENT SUBSTRATE

10 DIFFRACTIVE OPTICAL ELEMENT

FIG. 4

MEMBERS USED FOR MANUFACTURING
DIFFRACTIVE OPTICAL ELEMENT

| MEMBER | REMARKS |
|---|---|
| LIQUID CRYSTAL | Manufactured by Merck Japan Ltd., Model name : BDH-TL213<br>ne=1.7659, no=1.5271, Dielectric anisotropy $\Delta \varepsilon$ =5.7 |
| TRANSPARENT SUBSTRATE | Glass substrate manufactured by Nippon Electric Glass Co., Ltd.<br>Model name : OA-10<br>n=1.52, Size : 150mm square, 0.7mm thick |
| TRANSPARENT ELECTRODE | Material : ITO, 100nm thick<br>Pattern : 5μm wide, 10μm arrangement pitch |

FIG. 5

MANUFACTURING PROCESS OF DIFFRACTIVE OPTICAL ELEMENT

| # | STEP | CONTENTS |
|---|------|----------|
| 1 | ALIGNMENT LAYER FORMATION | Polyimide is spin coated on both an electrode substrate and an opposite substrate, and then heated. |
| 2 | RUBBING | Unnecessary |
| 3 | SEALANT COATING | A sealant containing rod-like spacers 6μm in diameter is coated on the electrode substrate, and then heated provisionally. |
| 4 | SPACER SPREADING | Spacers of 6μm in diameter are spread on the opposite substrate. |
| 5 | BONDING | The electrode substrate and the opposite substrate are bonded and heated with load applied. |
| 6 | MEASURING DISTANCE BETWEEN SUBSTRATES | The gap between the two substrates is measured. |
| 7 | SUBSTRATE CUTTING | Nine elements are separated from the bonded substrates. |
| 8 | LIQUID CRYSTAL INJECTION | A liquid crystal is injected from an injection port by capillarity phenomenon. |
| 9 | SEALING PORT SEALING | UV (Ultraviolet ray) cured resin is used. |
| 10 | LEAD WIRE CONNECTION | Lead wires are soldered to pads by ultrasonic solder. |

10b DIFFRACTIVE OPTICAL ELEMENT

11b  TRANSPARENT SUBSTRATE
12b  TRANSPARENT ELECTRODE
13b  SEAL MATERIAL
14b  LIQUID CRYSTAL SEALING PORT
15b  LIQUID CRYSTAL
17b  PAD
18b  TRANSPARENT SUBSTRATE

10c DIFFRACTIVE OPTICAL ELEMENT

11c TRANSPARENT SUBSTRATE
12c TRANSPARENT ELECTRODE
13c SEAL MATERIAL
14c LIQUID CRYSTAL SEALING PORT
15c LIQUID CRYSTAL
17c PAD
18c TRANSPARENT SUBSTRATE
19 TFT CIRCUIT

10 DIFFRACTIVE OPTICAL ELEMENT
20 STOP
21 OPENING

10 DIFFRACTIVE OPTICAL ELEMENT
30 OPTICAL FIBER FOR OUTPUT

10d DIFFRACTIVE OPTICAL ELEMENT
11d TRANSPARENT SUBSTRATE
15d LIQUID CRYSTAL
18d TRANSPARENT SUBSTRATE
30 OPTICAL FIBER FOR OUTPUT
31 OPTICAL FIBER FOR INPUT
32 RECESS
33 ADHESIVE

10e DIFFRACTIVE OPTICAL ELEMENT
11e TRANSPARENT SUBSTRATE
15e LIQUID CRYSTAL
18e TRANSPARENT SUBSTRATE
30e OPTICAL FIBER FOR OUTPUT
31e OPTICAL FIBER FOR INPUT
32e RECESS
33e ADHESIVE
34 OPTICAL FIBER HOLDER
35 ADHESIVE

10 DIFFRACTIVE OPTICAL ELEMENT
20f STOP
21f OPENING
40 POWER MONITOR

10g DIFFRACTIVE OPTICAL ELEMENT
19g TFT CIRCUIT
20g STOP
21g OPENING
22g MIRROR
41g POWER MONITOR

12ha, 12hb, 12hc  TRANSPARENT ELECTRODE
17ha, 17hb, 17hc  PAD

11 TRANSPARENT SUBSTRATE
12ha, 12hb, 12hc TRANSPARENT ELECTRODE
15 LIQUID CRYSTAL
16 ALIGNMENT LAYER
18 TRANSPARENT SUBSTRATE

101 TRANSPARENT SUBSTRATE
102 TRANSPARENT ELECTRODE
103 TRANSPARENT MATERIAL
104 LIQUID CRYSTAL

111 TRANSPARENT SUBSTRATE
112 TRANSPARENT ELECTRODE
113 TRANSPARENT SOLID MATERIAL
114 LIQUID CRYSTAL

121 TRANSPARENT SUBSTRATE
122 TRANSPARENT ELECTRODE
123 TRANSPARENT SOLID MATERIAL
124 LIQUID CRYSTAL

DIFFRACTIVE OPTICAL ELEMENT AND OPTICAL DEVICE USING THE SAME

BACKGROUND OF THE INVENTION

1. Field of the Invention

The present invention relates to a diffractive optical element and an optical device using the same, and more particularly to a diffractive optical element using a liquid crystal.

2. Description of the Related Art

Active diffractive optical elements using a liquid crystal have been known. As an example of such conventional diffractive optical elements, a configuration of an element disclosed in Japanese Patent Laid-Open No. 2-40615 is shown in FIG. 23.

In FIG. 23, the diffractive optical element includes a transparent substrate 101 having a transparent electrode 102 on one side thereof, a transparent material with a periodic thickness variation 103, another transparent substrate 101 having another transparent electrode 102 thereon, and a liquid crystal 104 sandwiched therebetween. In this case, a liquid crystal layer is about 6 µm thick.

The amplitude of the thickness variation for the material 103 is 50 nm. This uneven structure causes slight differences in thickness of the liquid crystal layer, thereby causing periodic differences in electric field strength when a voltage is applied to the two transparent electrodes 102. The liquid crystal used herein is of a cholesteric/nematic phase change type. It changes from a cholesteric phase to a nematic phase when the applied bias is increased.

A case where the applied voltage decreases to cause transition from the nematic phase to the cholesteric phase will be considered. In the nematic phase, light entering the element transmits the element undiffracted. When the liquid crystal changes to the cholesteric phase, liquid crystal molecules are oriented parallel to the substrate selectively at recesses of the substrate with weak electric fields. This causes periodic refractive index distribution to form a phase diffraction grating.

Japanese Patent Laid-Open No. 2-40615 also discloses another configuration where a transparent electrode is formed on a transparent substrate having an uneven structure previously formed thereon, and a configuration where a transparent electrode having an uneven structure is formed on a surface of a flat transparent substrate. In either configuration, the transparent electrodes are provided across both transparent substrates sandwiching the liquid crystal, and the periodic uneven structure is provided on one transparent substrate, thereby causing slight differences in strength in the electric field distribution inside the liquid crystal layer.

An active diffractive optical element using a liquid crystal with a different configuration is disclosed in Japanese Patent Laid-Open No. 5-72509. A configuration thereof is shown in FIG. 24. In FIG. 24, two transparent substrates 111 provided with transparent electrodes 112 are used to sandwich a liquid crystal 114 similarly as the above described element, but a feature in FIG. 24 is that rectangular transparent solid materials 113 are periodically placed to separate the liquid crystal 114.

For a well-controlled molecular alignment of the liquid crystal, it is preferable to provide alignment treatment on the transparent electrode, though not shown. Specifically, this treatment includes rubbing a polymeric material such as polyimide coated on the surface of the transparent electrode, or oblique deposition of a material such as SiO.

The operation of the element in FIG. 24 is described below. A refractive index of the liquid crystal to a light entering the liquid crystal can be switched between a state of matching a refractive index of the material 113 and a state of not matching it, depending on whether a voltage is applied or not to the two transparent electrodes 112. When the refractive index of the liquid crystal matches the refractive index of the material 113, the light transmits the element undiffracted. When the refractive indices periodically differ, the element operates as a phase diffraction grating. Thus, an optical device such as a switchable filter can be obtained.

Further, a diffractive optical element similar to the element in FIG. 24 is presented in a paper by Sakata, et al., "Switchable zero-order diffraction filters using fine-pitch phase gratings filled with liquid crystals," (Jpn. J. Appl. Phys. Vol. 39, 2000, pp. 1516–1521).

A configuration described in the paper is shown in FIG. 25. Two transparent substrates 121 with transparent electrodes 122 are used to sandwich a liquid crystal 124. The feature of this configuration is that each of the periodically-placed transparent solid materials 123 has a trapezoidal cross-section.

As in the case shown in FIG. 24, refractive indices of the transparent solid material and the liquid crystal are selected such that a light entering the element in FIG. 25 transmits undiffracted when the voltage is applied, and is diffracted when the voltage is not applied. The cross-section of the transparent solid material is formed into a trapezoidal shape instead of a rectangle to increase an intensity ratio (extinction ratio) of lights that can be switched ON/OFF in a wide visible spectrum range.

In the conventional diffractive optical elements using liquid crystal, a step for forming a film of a transparent electrode material over a transparent substrate, and a patterning step for forming electrode and terminal areas have to be performed on both of the two transparent substrates. In addition, a step for forming the periodic uneven structure or the periodic array of transparent solid materials is required. To form the section of the transparent solid material into the trapezoidal shape or the like, for example, a step for heating and softenning a resist material is added. To orient the liquid crystal molecules to a desired direction, it is preferable to provide alignment treatment such as rubbing or oblique deposition of SiO for example on the transparent electrode. Therefore, it is difficult to reduce manufacturing costs of the conventional active diffractive optical elements using liquid crystal.

Further, to increase a diffraction angle, a finer pitch is required for the periodic structure of the uneven structure or the periodic array of the transparent solid materials. Since the liquid crystal molecules are anchored to the surface of the uneven structure or the transparent solid material, it becomes difficult to change orientations of the liquid crystal molecules. Changing the orientations of the liquid crystal molecules firmly anchored to the surface takes much time, so that a finer pitch of the periodic structure causes reduction in speed for altering the liquid crystal orientation. As a result, for the conventional active diffractive optical elements using liquid crystal, it is difficult to increase the diffraction angle with no response speed penalty.

Further, related arts do not teach arraying many diffractive optical elements to obtain a multi-channel optical device. Specifically, related arts do not teach an approach to reduction in a manufacturing cost per unit channel.

A diffractive optical element is applied for optical devices such as a variable optical attenuator, a polarization separator, an optical switch, a filter, or the like. These optical devices often use optical fibers for guiding light to the diffractive optical element and guiding an output light from the diffractive optical element to an outside. When many diffractive optical elements are arrayed to obtain a multi-channel optical device, the number of optical fibers increases. Therefore, mounting of the optical fibers to the optical device becomes difficult. The related arts do not teach an effective mounting method of the optical fibers.

A power of light entering a diffractive optical element or an intensity of a diffracted light as an output may vary due to some causes that are difficult to control beforehand. For example, a temperature variation can change characteristics of a liquid crystal. A variation in mechanical load to an optical fiber can also cause such a detrimental effect. If a variation of the power is monitored and the voltage applied to the diffractive optical element is adjusted accordingly, there may be provided a diffractive optical element and an optical device using the same that do not depend on these variation factors. However, the related arts do not teach a concept of detecting the intensity of the diffracted light.

If a diffraction angle can be switched as well as the intensity of the diffracted light, the degree of design freedom widens in many applications. However, in the related arts, the pitch of the periodic structures is fixed. Therefore, in the elements shown in FIGS. 23 to 25, the diffraction angle can not be switched.

SUMMARY OF THE INVENTION

An object of the present invention is to provide a diffractive optical element and an optical device using the same that allow simplification of a manufacturing process and reduction in manufacturing costs.

According to the first aspect of the present invention, a diffractive optical element comprising:

first and second transparent substrates;

a liquid crystal layer sandwiched between the first transparent substrate and the second transparent substrate;

a plurality of transparent electrodes provided on a surface facing said liquid crystal layer of at least one of the first transparent substrate and the second transparent substrate; and control means for setting potentials of the transparent electrodes.

According to the second aspect of the present invention, an optical device, the device using the diffractive optical element, and selecting a diffracted light of specific order from the diffractive optical element as output.

According to the third aspect of the present invention, an optical device, the device using the diffractive optical element, and selecting a diffracted light of high order from the diffractive optical element as output.

Specifically, the present invention relates to a diffractive optical element using a liquid crystal, and more particularly to an active diffractive optical element whose optical characteristics can be electrically controlled.

The present invention relates to a variable optical attenuator for attenuating a power of an incident light to a desired level, a polarization separator for transmitting one polarization component only, or an optical switch for branching a light into two or more parts, in a field of optical communications or optical interconnection.

The present invention relates to a filter or an optical demultiplexer for demultiplexing a light having a plurality of wavelengths into each wavelength, in a field of display devices and devices for scientific measurements. A variable optical attenuator, a polarization separator, an optical switch, a filter, an optical demultiplexer are collectively referred to as optical devices hereinafter as long as there is not the necessity of limitation.

In order to attain the above described object, first, the present invention provides a diffractive optical element including: plurality of transparent electrodes formed on the surface of one transparent substrate facing a liquid crystal layer; and control means for setting potentials of the transparent electrodes.

Second, the present invention provides the diffractive optical element, wherein a circuit for controlling the potentials of the transparent electrodes is formed on the same transparent substrate using thin film transistors.

Third, the present invention provides a variable optical attenuator, a polarization separator, and an optical switch using the diffractive optical element, wherein a diffracted light of one or more specific diffraction orders from the diffractive optical element is selected as output.

Fourth, the present invention provides a filter, and an optical demultiplexer using the diffractive optical element, wherein a diffracted light of one or more high diffraction orders from the diffractive optical element is selected as output.

Fifth, the present invention provides an optical device using the diffractive optical element, wherein a light input to the diffractive optical element is fed through an optical fiber, and the optical fiber is inserted into a recess provided on a surface not facing the liquid crystal layer of the transparent substrate of the diffractive optical element.

Sixth, the present invention provides an optical device using the diffractive optical element, wherein a diffracted light from the diffractive optical element is extracted through an optical fiber, and the optical fiber is inserted into a recess provided on a surface not facing the liquid crystal layer of the transparent substrate of the diffractive optical element.

Seventh, the present invention provides an optical device using the diffractive optical element, wherein fixing means of the optical fiber is provided at a predetermined distance from the surface not facing the liquid crystal layer of the transparent substrate of the diffractive optical element, and the diffracted light is extracted through the optical fiber placed in the fixing means.

Eighth, the present invention provides an optical device using the diffractive optical element, further including power detecting means for monitoring an intensity of a diffracted light of one or more specific diffraction orders.

Ninth, the present invention provides an optical device using the diffractive optical element, wherein the power detecting means for montitoring the intensity of the diffracted light of the specific order from the diffractive optical element is formed on one of the transparent substrates included in the diffractive optical element.

Tenth, the present invention provides the diffractive optical element and the optical device using the same, wherein the liquid crystal is of a positive type and vertically oriented to each substrate.

The configurations as described above allows providing, at a low cost, an active diffractive optical element whose characteristics can be electrically controlled, and an optical device having one or more diffractive optical elements arranged.

Further, when optical fibers are used for input and output of the optical device, an optical fiber mounting method can be provided at a low cost. There can be also provided a diffractive optical element and an optical device using the same with high reliability and environmental resistance.

BRIEF DESCRIPTION OF THE DRAWINGS

FIG. 4 is a table listing members used for manufacturing the diffractive optical element according to the first embodiment of the present invention;

FIG. 5 is a table listing a manufacturing process of the diffractive optical element according to the first embodiment of the present invention;

DETAILED DESCRIPTION OF THE PREFERRED EMBODIMENTS

Figure 1:
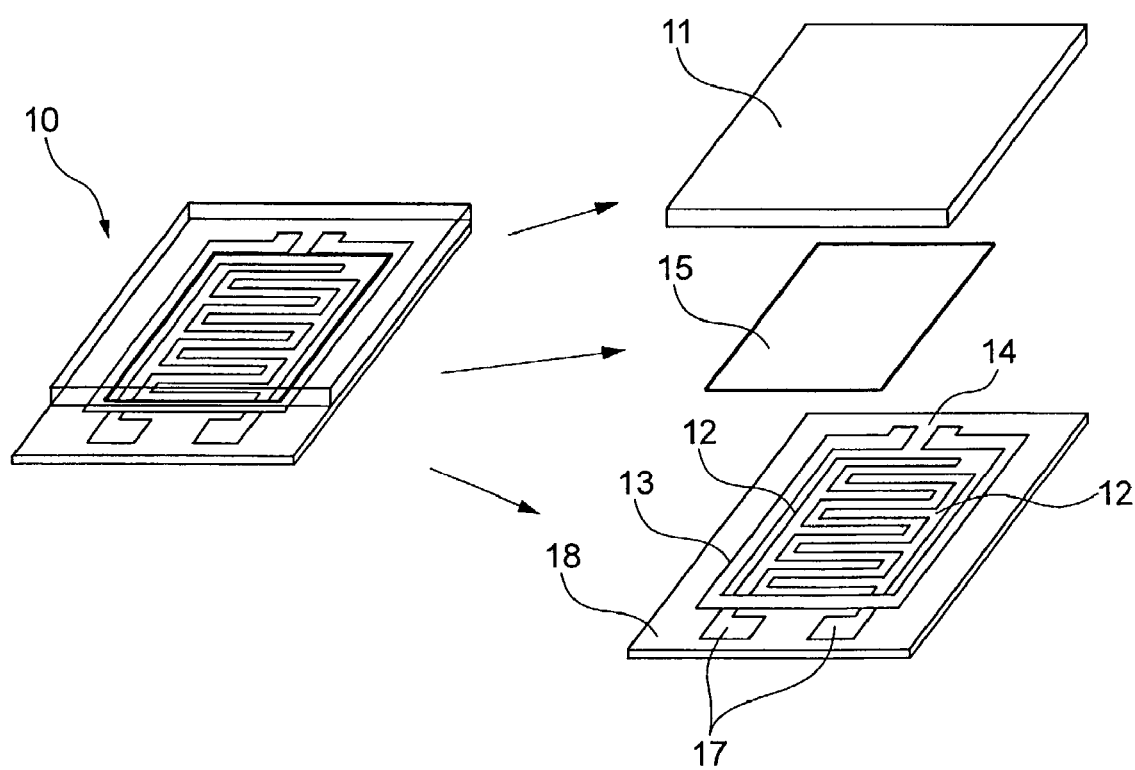
FIG. 1 is a perspective view showing a configuration of a diffractive optical element according to a first embodiment of the present invention.
Figure 2:
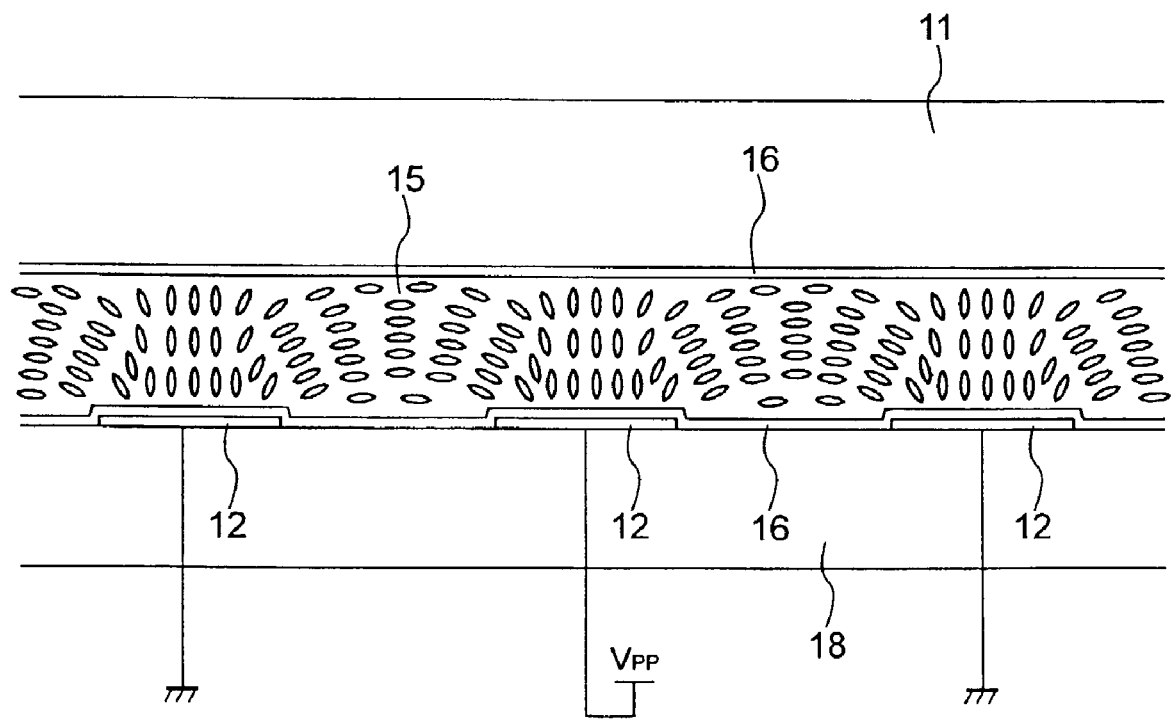
FIG. 2 is a sectional view for explaining an operating principle of the diffractive optical element according to the first embodiment of the present invention.

Now, embodiments of the present present invention will be described with reference to the drawings. FIG. 1 is a perspective view showing a configuration of a diffractive optical element according to a first embodiment of the present invention, and FIG. 2 is a sectional view for explaining an operating principle of the diffractive optical element according to the first embodiment of the present invention.

As shown in an exploded perspective view in a right part of FIG. 1, a diffractive optical element 10 includes a transparent substrate 18 having a pair of transparent interdigitated electrodes 12 facing each other formed on its surface, another transparent substrate 11, and a liquid crystal 15 sandwiched therebetween. As shown in a sectional view of FIG. 2, alignment layers 16 are formed on surfaces of the transparent substrates 11 and 18 facing the liquid crystal 15.

Further, as shown in FIG. 1, pads 17 are provided for electrical connection to an outside. A seal material 13 and a liquid crystal sealing port 14 are provided on the transparent substrate 18, and as shown in FIG. 1, the seal material 13 is formed into a partly cut rectangle, and the liquid crystal sealing port 14 is formed at the cut portion of the rectangular seal material 13.

Figure 3:
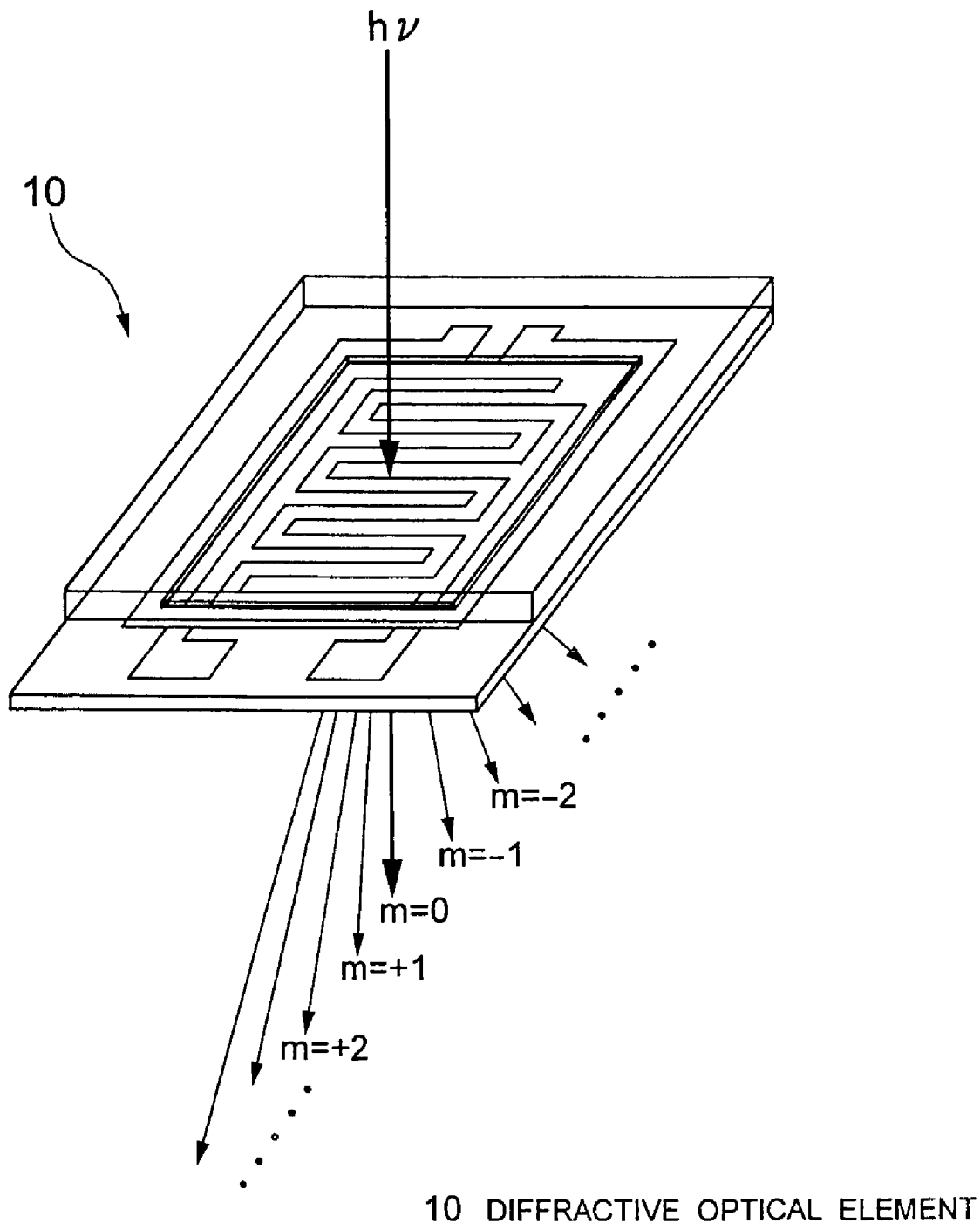
FIG. 3 is a perspective view for explaining operation of the diffractive optical element according to the first embodiment of the present invention.

FIG. 3 is a perspective view for explaining operation of the diffractive optical element according to the first embodiment of the present invention, FIG. 4 is an illustration showing members used for manufacturing the diffractive optical element according to the first embodiment of the present invention, and FIG. 5 is an illustration showing a manufacturing process of the diffractive optical element according to the first embodiment of the present invention.

Figure 6:
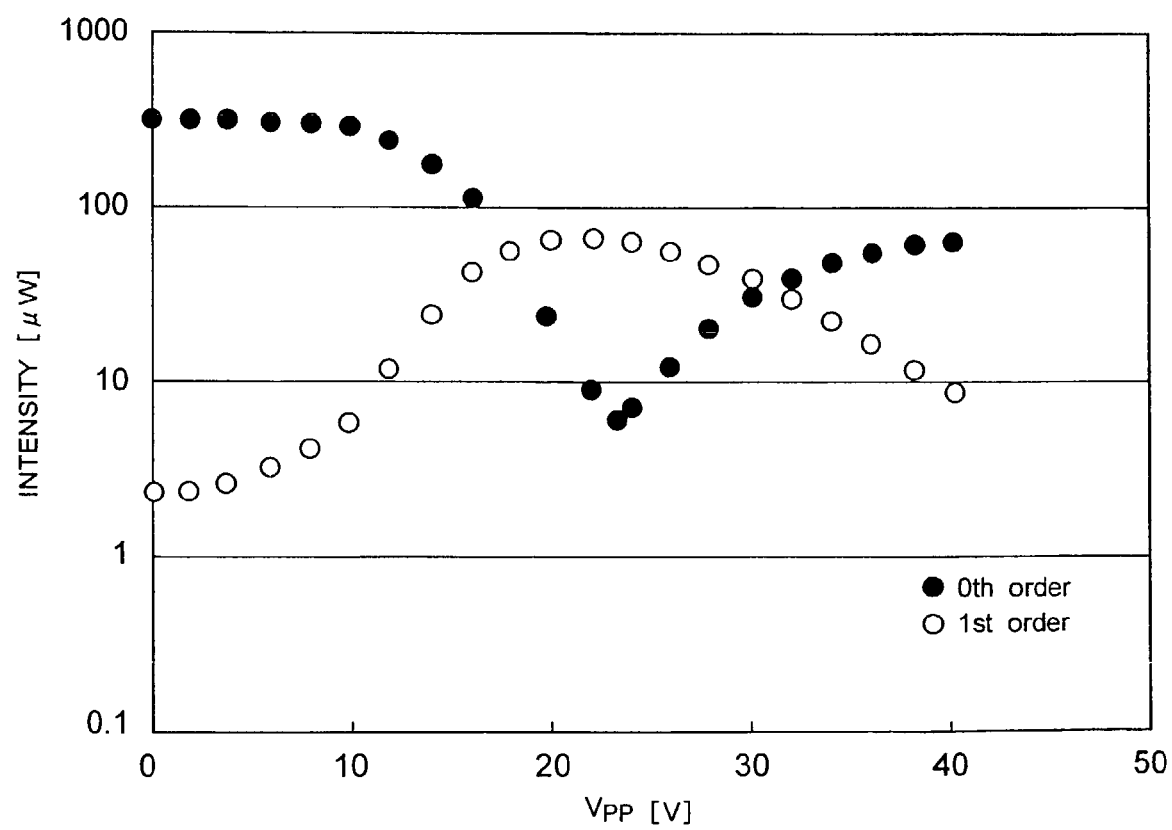
FIG. 6 is a graph showing a characteristic of the diffractive optical element according to the first embodiment of the present invention.
Figure 7:
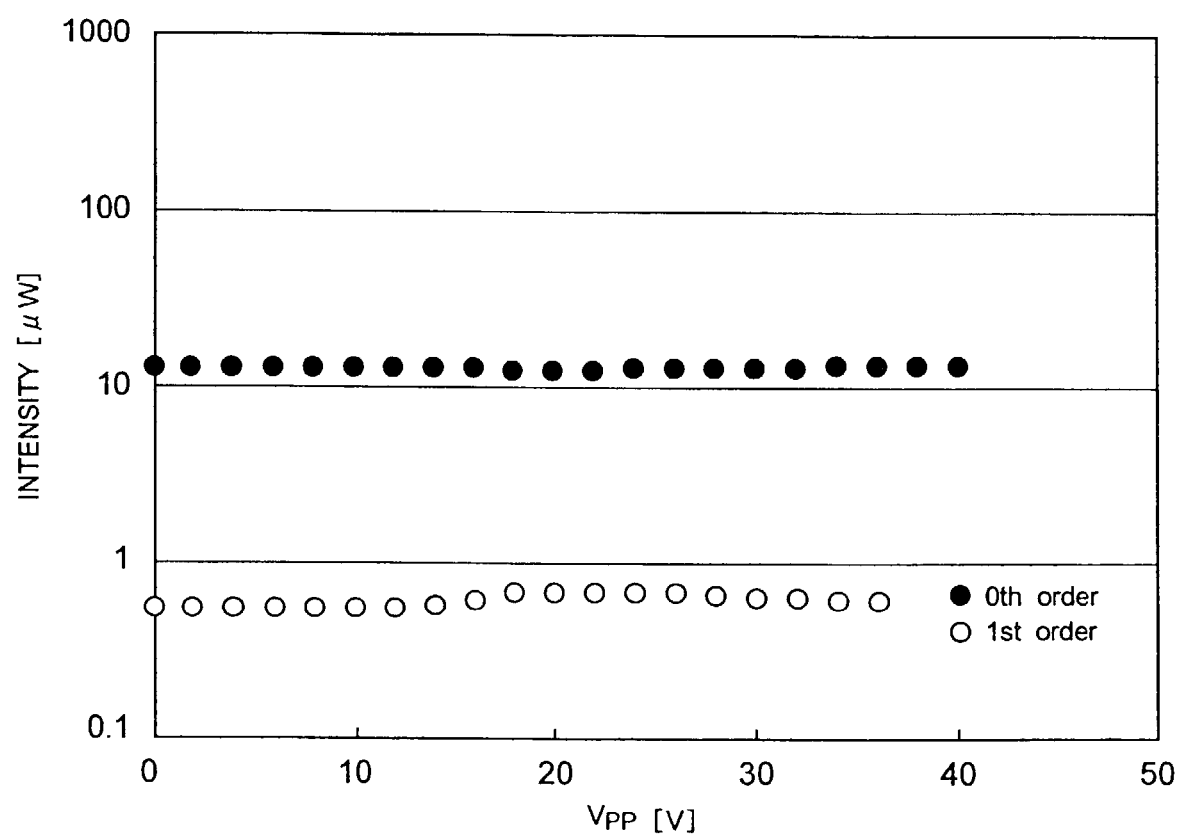
FIG. 7 is a graph showing a characteristic of the diffractive optical element according to the first embodiment of the present invention.

FIG. 6 is a graph showing a characteristic of the diffractive optical element according to the first embodiment of the present invention, and FIG. 7 is a graph showing a characteristic of the diffractive optical element according to the first embodiment of the present invention. Operation of the diffractive optical element will be described with reference to FIGS. 2 to 7.

FIG. 2 schematically shows liquid crystal molecules by ellipses, as is typical in operation descriptions of liquid crystals. The liquid crystal molecule has anisotropy of a refractive index, and a longer axis of the ellipse represents a refractive index $n_e$ for an extraordinary light, and a shorter axis thereof represents a refractive index $n_o$ for an ordinary light. Of course, the liquid crystal molecule is much smaller than the width of the transparent electrode 12, and FIG. 2 does not show an actual size or a shape of the liquid crystal molecule. The liquid crystal 15 has positive dielectric anisotropy. A material for the alignment layer 16 is selected such that the liquid crystal molecules are vertically oriented to the alignment layer 16 when a voltage is not applied to the transparent electrodes 12.

Next, operation when the voltage is not applied to the transparent electrodes 12 will be described. In this case, the liquid crystal molecules are oriented vertically to the alignment layer 16 everywhere. Thus, optical path for the light entering the element differs only slightly depending on presence or absence of the transparent electrodes 12. The transparent electrodes 12 are periodically arranged to cause a periodic phase difference $\Delta\phi=2\pi nt/\lambda$ for the incident light, where $\lambda$ is the wavelength of light, n is the refractive index of the transparent electrode material, and t is the thickness of the transparent electrode material.

A periodic structure having the phase difference $\Delta\phi$ operates as a diffraction grating. However, the phase difference $\Delta\phi$ is small, and in such a case, an intensity of a diffracted light is significantly low to generate a zero order diffracted light (that is, a transmitted light) in most cases, as described later in detail.

Operation when a voltage $V_{pp}$ is applied to the transparent electrodes 12 will be described. In this case, orientations of the liquid crystal molecules change depending on the voltage $V_{pp}$ as well as a position x. That is, when the voltage is applied to the transparent electrodes 12, an electric field is formed in a space around the transparent electrodes 12, and most of the liquid crystal molecules are oriented along an electric line of force.

The liquid crystal molecules in FIG. 2 show distribution of the electric line of force. The liquid crystal 15 is vertically oriented to the transparent substrates 11 and 18 in the regions above the transparent electrodes 12. They are oriented parallel to the transparent substrates 11 and 18 in the regions between the transparent electrodes 12. The molecules near the alignment layer 16 remain vertically oriented, but when the applied voltage is increased, they are also oriented in a direction of the electric field.

As shown in FIG. 3, a light having a wavelength $\lambda$ that vertically enters the liquid crystal 15 will be considered. First, a polarization component in which an electric field is parallel to an arranging direction of the transparent electrodes 12 senses the refractive index $n_e$ in a region where the liquid crystal 15 is oriented parallel to the transparent substrate 11, and senses the refractive index $n_o$ in a region where the liquid crystal 15 is vertically oriented to the transparent substrate 11.

A phase shift for the light transmitting the liquid crystal 15 is $2\pi n(x, V_{pp})d/\lambda$, where n (x, $V_{pp}$) is refractive index distribution of the liquid crystal 15, and d is a thickness thereof. At this time, the regions with different liquid crystal molecules orientations are periodically repeated, so that the phase-shift distribution is a periodic function of the position x. This is superimposed on the phase-shift distribution created by the transparent electrodes 12.

This structure operates as a phase diffraction grating, and as schematically shown in FIG. 3, many diffracted lights are generated in addition to the transmitted light. The phase-shift distribution changes depending on the applied voltage $V_{pp}$, and thus the diffractive optical element 10 operates as an active diffraction grating whose characteristics can be electrically controlled. This controllability will be described later in detail with specific examples.

The above described operation is for the case where the light entering the diffractive optical element 10 is the polarization component in which the electric field is parallel to the arranging direction of the transparent electrodes 12. For the other polarizaiton component of the incident light, a refractive index of the liquid crystal 15 is always $n_o$ regardless of the applied voltage, so that the diffracted light is not generated. Thus, the diffractive optical element 10 has polarization dependence, and can be operated as, for example, a polarization separator for transmitting a specific polarization component only.

Polarization dependence is a general characteristic directly caused by the characteristic of liquid crystal 15, as is well understood in the related arts. For uses in which the polarization dependence may cause inconvenience, it can be removed by stacking two elements having the polarization dependence orthogonally to each other as disclosed in Japanese Patent Laid-Open No. 5-72509.

In a similar mannar, two diffractive optical elements 10 can be stacked orthogonally to each other for the applications in which the polarization dependence may cause inconvenience.

Now, a manufacturing method of the diffractive optical element 10 and characteristics thereof according to this embodiment will be described in detail. Main members used for manufacturing the diffractive optical element 10 according to this embodiment are shown in FIG. 4. The liquid crystal 15 used herein is a nematic liquid crystal, and the transparent substrates 11 and 18 are no-alkali glass substrates. These materials are often used for manufacturing liquid crystal displays.

A 100 nm thick film of ITO (indium tin oxide) is formed on the transparent substrate 18. Then, a pair of interdigitated electrodes is formed on the transparent substrate 18 by photolithography. In the diffractive optical element 10 of this embodiment, a width of the electrode is 5 μm, and an arrangement pitch of the electrodes is 10 μm. An area of the substrate used is 150 mm square, and nine identical electrode patterns are formed on one substrate, and nine elements can be separated later.

The manufacturing process of the diffractive optical element 10 according to this embodiment is summarized in FIG. 5. The material for the alignment layer 16 is selected such that the liquid crystal 15 is vertically oriented to the alignment layer 16 when no voltage is applied.

In FIG. 5, in Step #1 of "alignment layer formation," polyimide is spin coated on both of the electrode substrate 18 and the opposite substrate 11, and then heated. In this embodiment, subsequent Step #2 of "rubbing" becomes unnecessary.

In Step #3 of "sealant coating," a sealant containing rod-like spacers of 6 μm in diameter is coated on the electrode substrate, and then heated provisionally. In Step #4 of "spacer spreading," spacers of 6 μm in diameter are spread on the opposite substrate. In Step #5 of "bonding," the electrode substrate and the opposite substrate are bonded and heated with load applied.

In Step #6 of "measuring distance between substrates," the gap between the two substrates are measured. In Step #7 of "substrate cutting," nine elements are separated from the bonded substrates. In Step #8 of "liquid crystal injection," the liquid crystal is injected from the sealing port by the use of capillarity phenomenon. In Step #9 of "sealing port sealing," UV (Ultraviolet ray) cured resin is used. In Step #10 of "lead wire connection," lead wires are soldered to the pads by ultrasonic solder.

Here, surface treatment such as rubbing or oblique deposition of a material like SiO required in the conventional technique becomes unnecessary. The spacer mixed into the seal material 13 and the spacer spread on the transparent substrates 11 and 18 are selected such that a distance between the two transparent substrates 11 and 18, that is, a thickness of the liquid crystal layer when the liquid crystal 15 is injected later is set to 6 µm. Each of these steps is a standard process used in manufacturing liquid crystal displays.

The characteristics of the diffractive optical element 10 manufactured in accordance with the above described process are evaluated by a method described below. Specifically, a laser diode is used as a light source. A monochromatic light having a 670-nm wavelength from the laser diode vertically enters the diffractive optical element 10. A polarizer is placed between the light source and the element such that only one polarization component of the incident light enters the diffractive optical element 10.

If a polarization component whose electric field is vertical to the arranging direction of the transparent interdigitated electrodes enters, many diffracted lights are generated as schematically shown FIG. 3 when the voltage is applied to the electrodes. Results of changing the voltage applied to the electrodes and measuring intensities of the diffracted lights by a power meter are shown in FIG. 6.

In FIG. 6, it can be confirmed that the intensity of the zero order diffracted light (that is, a transmitting component without diffraction) decreases with increase in the applied voltage, and it increases after a minimum value is reached. On the other hand, a first order diffracted light performs contrary thereto, and it increases first and decreases after a maximum value is reached. In other words, a ratio between the intensities of the zero order diffracted light and the first order diffracted light decreases monotonously from a maximum value to a minimum value with the increase in the applied voltage. Both intensities match at a specific applied voltage.

This behavior will be understood as described below. First, while the applied voltage is low, most of the liquid crystal molecules remain vertically oriented to the transparent substrates 11 and 18. Thus, a phase shift that occurs when the light passes through the liquid crystal layer is uniform and it does not depend on the position. However, since the transparent electrodes 12 also cause the periodic phase-shift distribution, a weak diffraction is induced. In FIG. 6, the first order diffracted light having the intensity about 1/150th of the zero order diffracted light is observed when the applied voltage is zero. As described, this is caused by the transparent electrodes 12 periodically placed.

Next, as the applied voltage increases, a sufficiently high electric field appears in the region between the transparent electrodes 12, and the liquid crystal molecules in the region are oriented in the direction of the electric field. In the region immediately above the transparent electrode 12, the electric field is weak, and the liquid crystal molecules remain vertically oriented. In the region near the alignment layer 16, even if the electric field is high, the molecules are strongly anchored by the alignment layer 16, and cannot change their orientations.

With an increase in the applied voltage, the magnitude of the phase-shift distribution increases, and the phase difference becomes $\pi$ at a certain value of the applied voltage. Theoretical calculation on a phase grating having a rectangular phase-shift distribution with a 50% duty ratio shows that the intensity of the zero order diffracted light decreases with the phase difference, and becomes zero when the phase difference is $\pi$. An intensity of a diffracted light of odd-numbered order increases with a phase difference, and reaches a maximum when the phase difference is $\pi$. There is no diffracted light of even-numbered order. This tendency is well observed in FIG. 6.

However, in reality, as schematically shown in FIG. 2, the orientations of the liquid crystal molecules, that is, the distribution of the phase shift that occurs in the light transmitting the liquid crystal layer does not form a perfect rectangle. Thus, even at the applied voltage that causes the phase difference of $\pi$, the zero order diffracted light does not completely disappear as shown in FIG. 6. In other words, if the phase difference distribution can be made close to a rectangle with a 50% duty ratio, the intensity of the zero order diffracted light becomes close to zero at the applied voltage that causes the phase difference of $\pi$.

If the applied voltage is further increased after the intensity of the zero order diffracted light reaches the minimum, the electric field intensity further increases. Then, the liquid crystal molecules in the region immediately above the transparent electrode 12 or near the alignment layer 16 are also oriented in the direction of the electric field. Therefore, the phase difference also increases.

In the analysis with rectangular phase-shift distribution, the intensity of the zero order diffracted light increases as the phase difference increases beyond $\pi$, and it reaches the maximum at the phase difference of $2\pi$.

The diffracted light of the odd-numbered order decreases with the phase difference, and becomes zero at the phase difference of $2\pi$. Now, a maximum phase difference that can be reached by the element manufactured is calculated for the light having the wavelength $\lambda=670$ nm, the thickness of the liquid crystal layer is $d=6$ µm, and the refractive index difference between the extraordinary light and the ordinary light is $\Delta n = n_e - n_0 = 0.19$. The maximum phase difference becomes $2\pi \times \Delta n \times d/\lambda \sim 3.4\pi$. This value is larger than $2\pi$, so that the applied voltage at which the zero order diffracted light reaches the maximum value exists theoretically. However, when the electric field is sufficiently high, the liquid crystal molecules above the transparent electrode 12 are also horizontally oriented to cause deviation from the theoretical analysis. As shown in FIG. 3, the measured zero order diffracted light intensity does not really reach a maximum value at a high $V_{pp}$.

Results of a similar experiment with the polarizer rotated at 90° for confirming that the diffractive optical element 10 has the polarization dependence is shown in FIG. 7. Compared to FIG. 6, the difference is clear, and in this case, diffraction rarely occurs, and there is almost no indication of the applied voltage dependence of the transmitted light intensity. However, when taking a close look at FIG. 7, a weak diffracted light and its dependence on the applied voltage are observed. The tendency of the applied voltage dependence is similar to FIG. 6. This is because the laser diode used as the light source outputs polarization of both components, and the polarizer used herein is not perfect.

As described above, according to the configuration of this embodiment, the electrode material may be formed on one transparent substrate 18. There is no need for providing the substrate with an uneven structure or forming a column structure to separate the liquid crystal layer. Thus, the manufacturing process can be simplified compared to the conventional method that requires forming the transparent electrodes on two substrates, and requires forming an uneven structure of the substrate or a column structure.

In the conventional technique, alignment treatment such as rubbing or oblique deposition is performed on the surface of the transparent electrode for orienting the liquid crystal molecules to a desired direction. However, in this embodiment, the liquid crystal 15 is vertically oriented. No treatment on the alignment layer 16 is required. The above described simplified manufacturing process allows reduction in manufacturing costs of the diffractive optical element 10.

Since the uneven structure of the substrate or the column structure is not required, a proportion of the liquid crystal molecules firmly anchored to the surfaces of nearby objects is substantially smaller than the cases encountered in the conventional structure. This is a great advantage in forming a fine pitched periodic structure for increasing a diffraction angle. For forming a fine pitched periodic structure, the arrangement pitch of the transparent electrodes 12 must be small. In the configuration shown in FIG. 2, the proportion of the liquid crystal molecules anchored to the surfaces of nearby objects does not change. That is, the configuration of this embodiment facilitates increasing the diffraction angle compared to the conventional method. This is advantageous mainly in reduction in size when the configuration is applied for various optical devices described later.

In the first embodiment of the present invention described above, an example of vertically oriented liquid crystal at zero bias has been described. But the alignment method for the liquid crystal 15 is not limited to this. The liquid crystal molecules may be oriented parallel to the transparent substrates when the voltage is not applied. Or, they may be initially oriented parallel to the arranging direction of the electrodes, and may be vertically oriented thereto when the voltage is applied.

Various alignment methods for the liquid crystal can be set by selecting, for example, a rubbing direction. In this case, of course, a step of alignment treatment such as rubbing or oblique deposition is required, so that manufacturing costs of the alignment treatment is the same as in the conventional examples. However, except for this, all the above described advantages can be obtained. Thus, the configuration adopting various alignment methods other than the vertical alignment can be regarded as a modified embodiment of the present invention.

Sizes of component elements and kinds of materials in the first embodiment of the present invention can be selected without departing from the spirit of the present invention. For example, the sizes of the electrode or the liquid crystal layer are matters of design, and not limited to those described above. The injecting method of the liquid crystal 15 includes a method not using the capillarity phenomenon, such as coating. If the liquid crystal 15 is a polymeric liquid crystal, it may be formed by spin coating. In this case, the seal material is unnecessary. Thus, designs of various component elements and materials can be selected without departing from the spirit of the present invention. Therefore, the above described configurations can be regarded as modified embodiments of the present invention.

Figure 8:
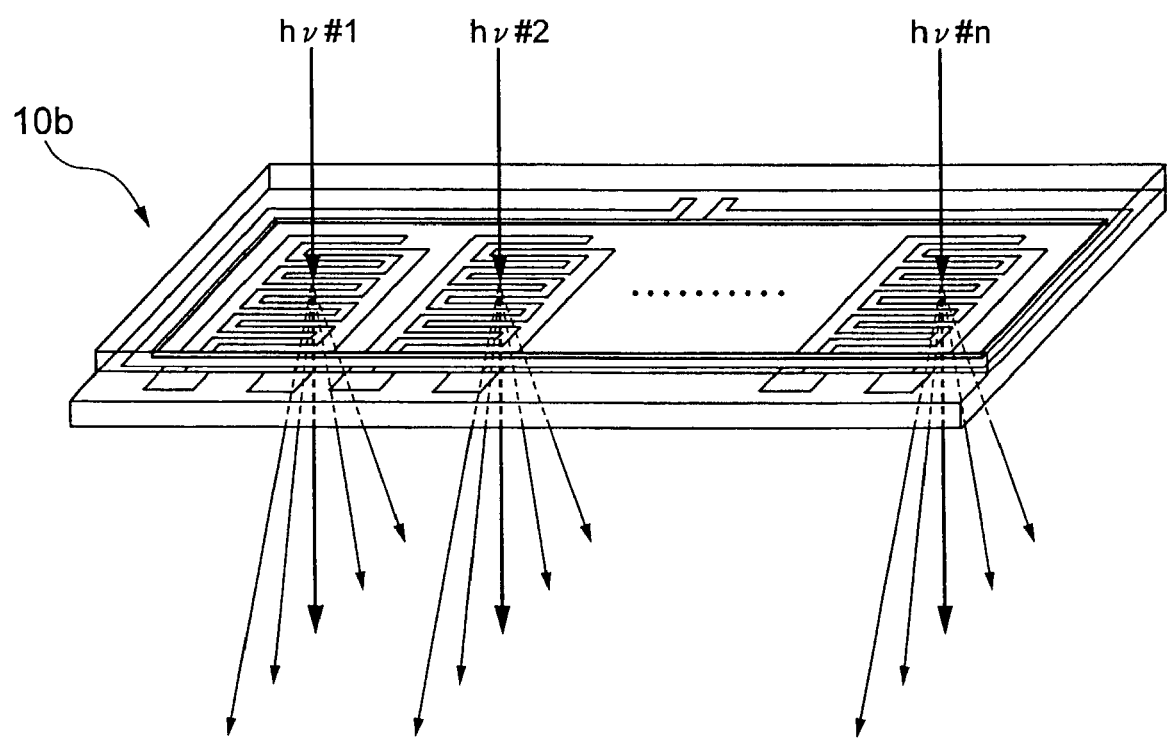
FIG. 8 is a perspective view for explaining operation of a diffractive optical element according to a second embodiment of the present invention.
Figure 9:
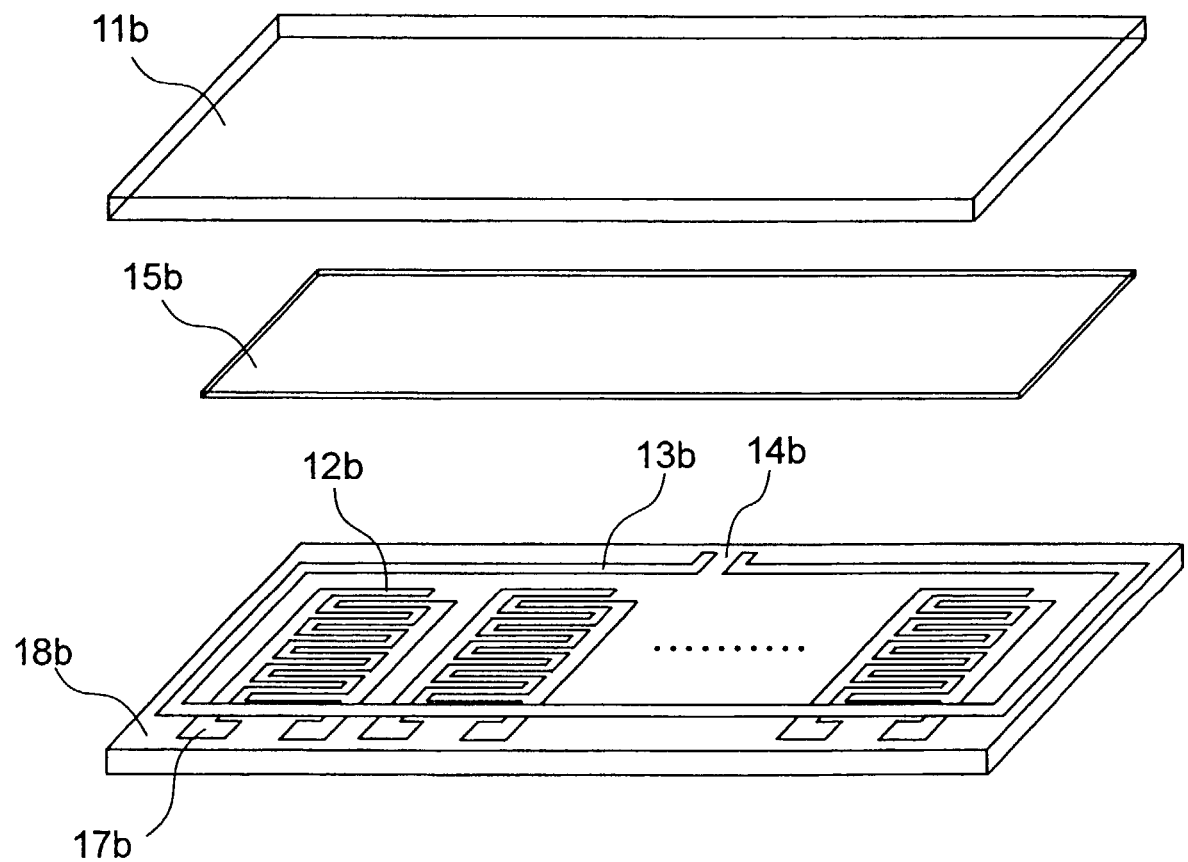
FIG. 9 is a perspective view showing a configuration of the diffractive optical element according to the second embodiment of the present invention.

FIG. 8 is a perspective view for explaining operation of a diffractive optical element according to a second embodiment of the present invention, and FIG. 9 is a perspective view showing a configuration of the diffractive optical element according to the second embodiment of the present invention. In FIG. 8, a diffractive optical element 10b is formed by arranging the plurality of diffractive optical elements 10 as described above, and controls a plurality of incident lights independently. As shown in an exploded perspective view of FIG. 9, the diffractive optical element 10b includes a transparent substrate 18b having a plurality of independent transparent electrodes 12b formed thereon, another transparent substrate 11b, and a liquid crystal 15b sandwiched therebetween.

In the second embodiment of the present invention, like the first embodiment of the present invention, an alignment layer is formed on the transparent substrate 18b. A seal material 13b provided with a liquid crystal sealing port 14b for sealing the liquid crystal 15b is formed on the alignment layer. An alignment layer is also formed on a surface of the transparent substrate 11b. These transparent substrates 11b and 18b are bonded together and the liquid crystal 15b is injected between the gap formed between these substrates.

Pads 17b are connected to an external control circuit (not shown). As shown in FIG. 8, the plurality of transparent electrodes 12b are formed in a direction such that diffracted lights do not interfere one another. Therefore, a short distance between adjacent elements is realized. That is, in the diffractive optical element lob, the plurality of diffractive optical elements (shown in FIG. 1) can be arranged with high density. A limit for this packing density is given by the situation where adjacent elements start to interfere.

The limit depends on a size and directivity of the incident light, a size of a coating material of an optical fiber for guiding the light to the diffractive optical element 10b, or the like. The diffractive optical elements can be easily arranged at a pitch of, for example, 100 µm or less. As described later, when only the zero order diffracted light is used as output, or for use that does not require a high packing density, arranging directions of the transparent electrodes (directions of the diffracted lights) may be set in any manner.

Features of the second embodiment of the present invention are that the plurality of transparent electrodes 12b are provided on the common transparent substrate 18b, and that the liquid crystal 15b is simultaneously injected to be sealed. This allows the diffractive optical elements to be arranged with a high density compared to the configuration having the independent elements mounted. This is advantageous in reduction in size of various optical devices described later such as a multi-channel variable optical attenuator. In addition, a manufacturing cost per channel can be reduced.

In the first embodiment and the second embodiment of the present invention, only the diffractive optical element is formed on the transparent substrate. Here a part of a circuit for controlling the potential of the transparent electrode can be formed on the same transparent substrate. In a third embodiment of the present invention, such a control circuit is formed on the transparent substrate using thin film transistors (TFTs) or the like by the low-temperature poly crystalline silicon technology.

Figure 10:
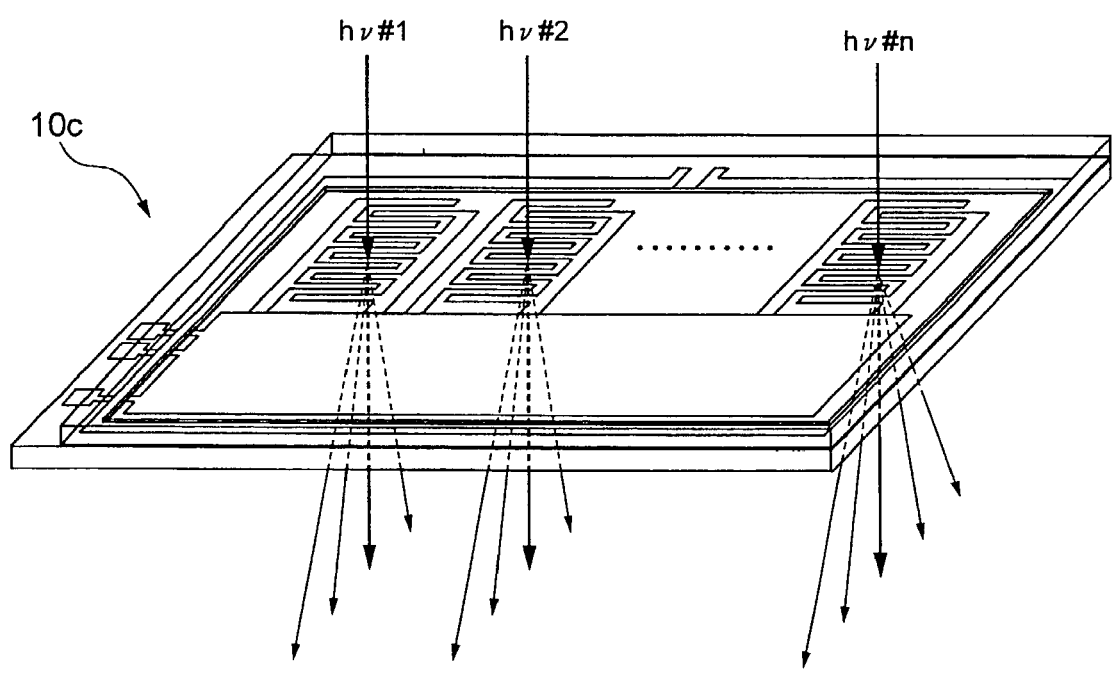
FIG. 10 is a perspective view for explaining operation of a diffractive optical element according to a third embodiment of the present invention.
Figure 11:
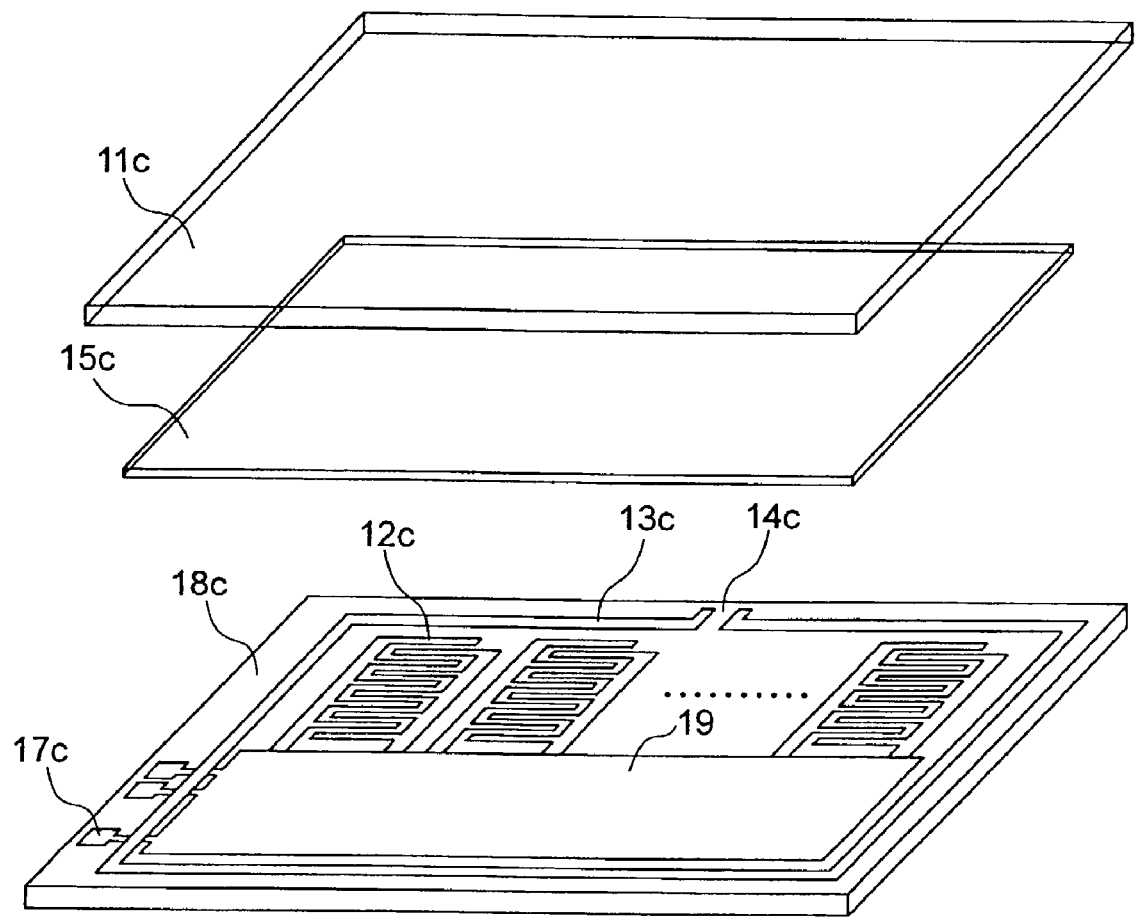
FIG. 11 is a perspective view showing a configuration of the diffractive optical element according to the third embodiment of the present invention.
Figure 12:
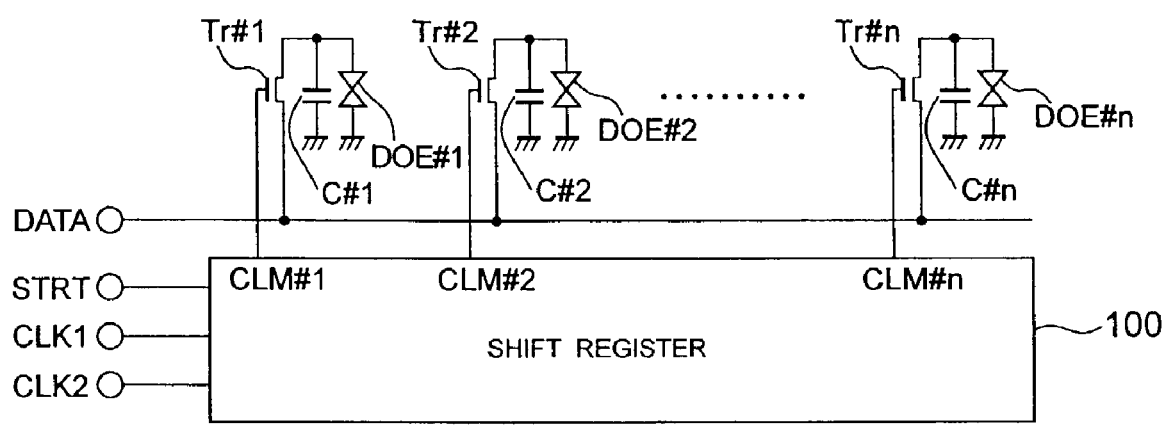
FIG. 12 is a circuit diagram showing a configuration of a TFT circuit of the diffractive optical element according to the third embodiment of the present invention.
Figure 13:
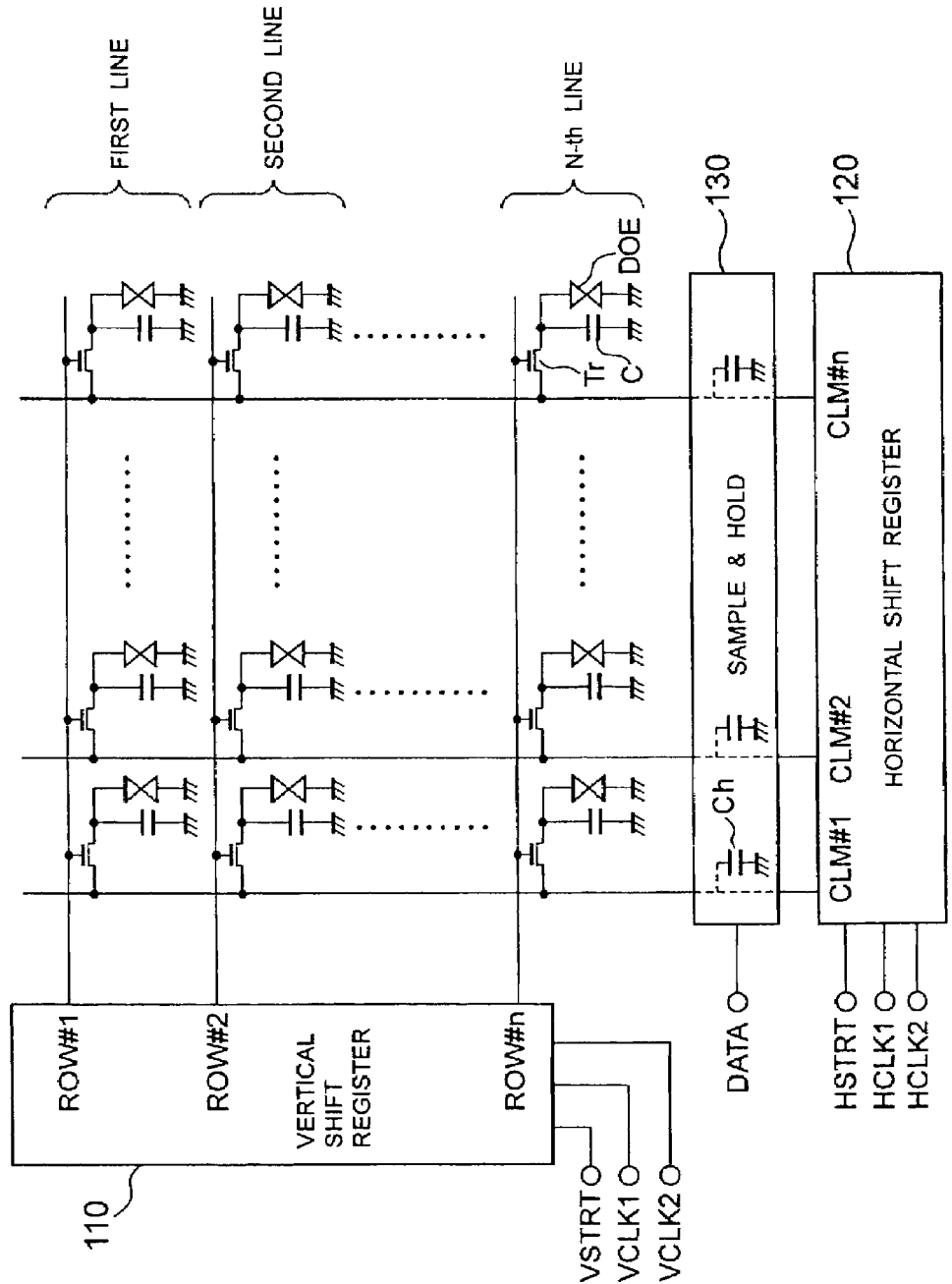
FIG. 13 is a circuit diagram showing a configuration of a TFT circuit of the diffractive optical element according to the third embodiment of the present invention.

FIG. 10 is a perspective view for explaining operation of a diffractive optical element according to the third embodiment of the present invention, FIG. 11 is a perspective view showing a configuration of the diffractive optical element according to the third embodiment of the present invention, and each of FIGS. 12 and 13 is a circuit diagram showing a configuration of a TFT circuit for the diffractive optical element according to the third embodiment of the present invention.

As shown in FIG. 11, a diffractive optical element 10c has a feature such that a TFT circuit 19 formed by the low-temperature poly crystalline silicon TFTs is provided on a transparent substrate 18c having transparent electrodes 12c formed thereon. A configuration of the TFT circuit 19 used herein is shown in FIG. 12. In FIG. 12, reference characters DOE#1 to DOE#n denote n diffractive optical elements arranged in one dimension. Other circuit elements in FIG. 12 are all included in the TFT circuit 19. That is, capacitance C#n and a thin film transistor Tr#n connect to the n-th diffractive optical element DOE#n, as shown in FIG. 12.

Output CLM#n of a shift resister 100 connects to a gate electrode of the thin film transistor Tr#n, and common wiring for data distribution connects to a source electrode thereof, and a signal DATA is applied to the source electrode. When control signals STRT, CLK1, CLK2 are input to the shift resister 100, rectanglular voltage signals are fed, in the order of outputs CLM#1, CLM#2, . . . , to the gate electrodes of the thin film transistors Tr#1, Tr#2, . . . Potential of the input signal DATA at this time is stored in the capacitances C#1, C#2, . . . At that instant, characteristics of the diffractive optical element 10c are set.

The voltage stored in each capacitance C does not change before another signal is fed to the gate electrodes of the corresponding thin film transistor Tr, thus the characteristics of the diffractive optical element 10c do not change. In this way, recording the input signal DATA in the capacitances C#1, C#2, . . . allows characteristics of all the diffractive optical elements to be set as desired.

Since the TFT circuit 19 which is a part of the control circuit is formed on the same transparent substrate, packaging is simplified and the size is reduced. The number of pads in FIG. 8 is proportional to the number of the diffractive optical elements, and each pad needs to be connected to an external printed wiring board or the like by wire bonding or the like. However, in the configuration in FIG. 11, the number of pads 17c is significantly reduced. The reduction in the number of the pads improves reliability of connections.

Since the functions provided by the TFT circuit 19 is not required in an external integrated circuit, the scale of the external integrated circuit is reduced. Therefore, reduction in sizes and costs of optical devices using the diffractive optical element 10c is achieved.

In FIG. 12, the diffractive optical elements DOE are arranged in one dimension, but they may be arranged in two dimensions. In this case, a circuit configuration for the corresponding TFT circuit is as shown in FIG. 13. That is, cells, each of which includes a diffractive optical element DOE, a capacitance C and a thin film transistor Tr as a unit are arranged in two dimensions, and shift resisters of two kinds: a shift resister 110 in a vertical direction and a shift resister 120 in a horizontal direction are connected as shown in FIG. 13, and a sample/hold circuit 130 for holding the input signal voltage DATA is added.

Operation of the TFT circuit in FIG. 13 is described below. First, the input signal voltage DATA is held at capacitances Ch of the sample/hold circuit 130. At a stage where all the input signal voltages DATA for the first line are held in the capacitances Ch, the voltage values are recorded in the capacitances C of the first line simultaneously. Repeating this operation for all the lines allows the characteristics of all diffractive optical elements DOE to be set. Arranging the diffractive optical elements DOE in two dimensions improves the packing density. However, the diffracted lights may interfere to cause crosstalk, so that caution is required for design of the diffractive optical element or placement of the other component elements.

The arrangement pitch of the diffractive optical elements DOE needs not to be constant, and the diffractive optical elements DOE can be arranged depending on uses. In the third embodiment, a part of the control circuit is formed on the transparent substrate to achieve reduction in packing costs and size. Therefore, the above described configuration can be regarded as a modified embodiment of the present invention.

Applications of the diffractive optical elements according to the above embodiments include optical devices such as a variable optical attenuator, a polarization separator, an optical switch, a filter, or the like.

Figure 14:
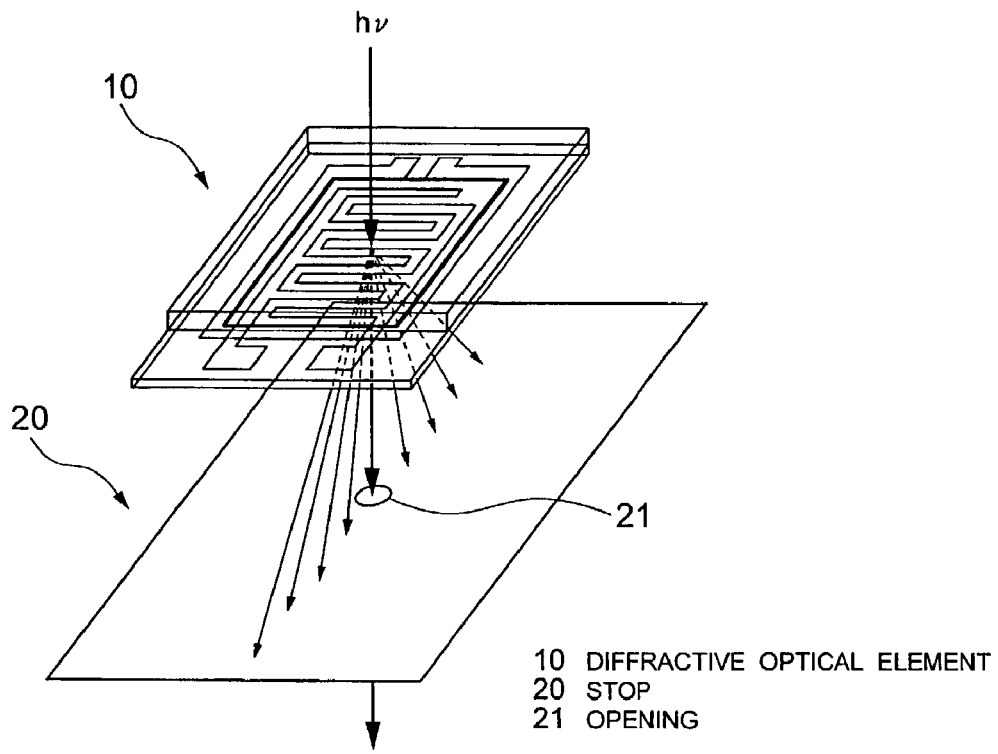
FIG. 14 is a perspective view showing a configuration and operation of an optical device using the diffractive optical element according to the first embodiment of the present invention.

FIG. 14 is a perspective view showing a configuration and operation of an optical device using the diffractive optical element 10 according to the first embodiment of the present invention. In FIG. 14, the optical device comprises the diffractive optical element 10 and a stop 20 having an opening 21. The stop 20 is provided to guide only the zero order diffracted light as output to an outside and intercept all the diffracted lights.

As shown in FIGS. 3, 6, 7, the diffractive optical element 10 can adjust the intensity of the zero order diffracted light by the applied voltage, so that the optical device in FIG. 14 operates as a variable optical attenuator. In the example in FIG. 3, the ratio between the minimum value and the maximum value is 50, but as described above, this ratio can be set to a larger value by a more careful design of the electric field distribution, selecting the liquid crystal material, etc.

The configuration where only the zero order diffracted light is selected as output is described above, but the diffracted light of another order can be selected as output by adjusting a position of the opening 21. Intensities of any order diffracted lights can be controlled by the applied voltage, thus the optical device which selects the diffracted light of specific order as output also operates as a variable optical attenuator.

If a plurality of openings are provided in the stop 20 to select a plurality of diffracted lights as output, the optical device can operate as an optical switch or a variable optical attenuator having an optical branching function.

As described above, for this diffractive optical element 10, it is possible to select one polarization component only to be attenuated or diffracted. That is, the diffractive optical element 10 has a function of diffracting one polarization component and transmitting the other polarization component undiffracted, so that the optical device also operates as a polarization separator.

When the incident light contains lights having different wavelengths, they can be separated and extracted by openings provided in the stop 20 that transmit the high order diffracted lights. In this case, the diffractive optical element 10 uses the feature where the diffraction angle depends on the wavelength. Hence, the optical device operates as an optical demultiplexer or a filter for extracting a light having a specific wavelength.

In the optical device in FIG. 14, the stop 20 provided with the opening is used in order to select a diffracted light of specific order. A similar optical device can be realized by using other means.

Figure 15:
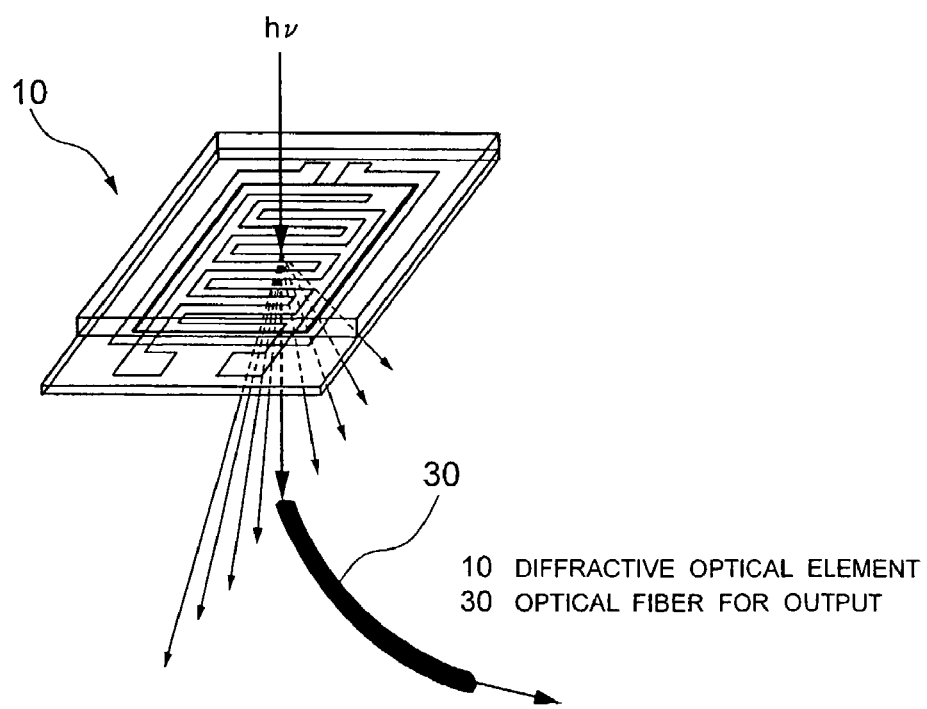
FIG. 15 is a perspective view showing a configuration and operation of another optical device using the diffractive optical element according to the first embodiment of the present invention.

FIG. 15 is a perspective view showing a configuration and operation of another optical device using the diffractive optical element 10 according to the first embodiment of the present invention. The optical device in FIG. 15 comprises the diffractive optical element 10 and an optical fiber 30. As shown in FIG. 15, the optical fiber 30 is provided in a position where the diffracted light selected as output enters. The diffracted light of specific order from the diffractive optical element 10 is selected as output by the optical fiber 30. Thus, similarly as the optical device in FIG. 14, the optical device in FIG. 15 operates as a variable optical attenuator, an optical switch, a filter, or the like.

Optical means other than the stop 20 or the optical fiber 30, for example, a mirror or a prism may be provided to select the diffracted light of the specific order and change its path. Thus, these configurations can be regarded as modified embodiments of the present invention.

As described above, when the diffracted light of the specific order is selected as output, any of the various optical means can be used. Especially, an optical device for optical communications is often used together with an optical fiber, thus it is important how the diffractive optical element and the optical fiber are joined. For the multi-channel diffractive optical element described in the second and third embodiments, many optical fibers are used for input and output, thus a mounting manner of the optical fibers is more important. Here, a configuration for efficiently connecting the diffractive optical element to the optical fibers will be now described.

Figure 16:
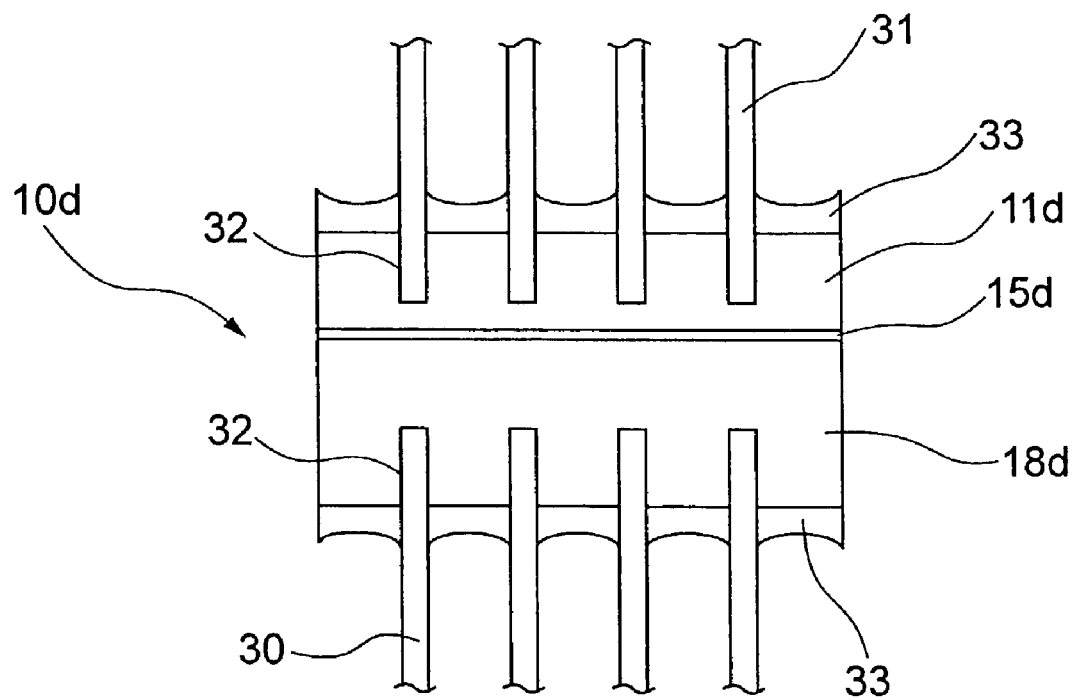
FIG. 16 is a sectional view of an optical device using a diffractive optical element according to a fourth embodiment of the present invention.

FIG. 16 is a sectional view of an optical device using a diffractive optical element according to a fourth embodiment of the present invention. In FIG. 16, recesses 32 are provided on each of the transparent substrates 11d and 18d that are component elements of a diffractive optical element 10d. Optical fibers 31 for input and optical fibers 30 for output are inserted into the corresponding recesses 32 and fixed by an adhesive 33.

For example, when a 100-µm diameter optical fiber and a 0.7-mm thick glass substrate as the transparent substrate lid are used, the recess 32 can be formed as described below.

First, before forming the diffractive optical element 10d, a photoresist is coated on one side of the transparent substrate 11d, and the photoresist in an area to be the recess 32 is removed by lithography.

Next, the area with the photoresist removed of the glass substrate is thinned to a predetermined thickness by chemical polishing, thus forming the recess 32. The surfaces after the chemical polishing are very flat so that there is no need for polishing a bottom of the recess 32 later. The recess 32 is formed similarly in the transparent substrate 18d.

After the diffractive optical element 10d is assembled using the transparent substrates 11d and 18d having the recesses 32, the optical fibers are inserted and bonded. When inserting the optical fiber, it is desirable to use a device that can simultaneously handle many optical fibers. In FIG. 16, the optical fiber 31 for input and the optical fiber 30 for output are placed so that both fibers face each other. But as described above, the placement is not limited to this, as in the cases of the optical device using the high order diffracted light as output.

Mounting the optical fibers in the diffractive optical element 10d as described above can reduce labor for packaging such as alignment. Depending on designs of the diffractive optical element or uses of the optical device including the diffractive optical element, it is sometimes required to place the optical fiber for output at a relatively large distance from the liquid crystal layer of the diffractive optical element.

Figure 17:
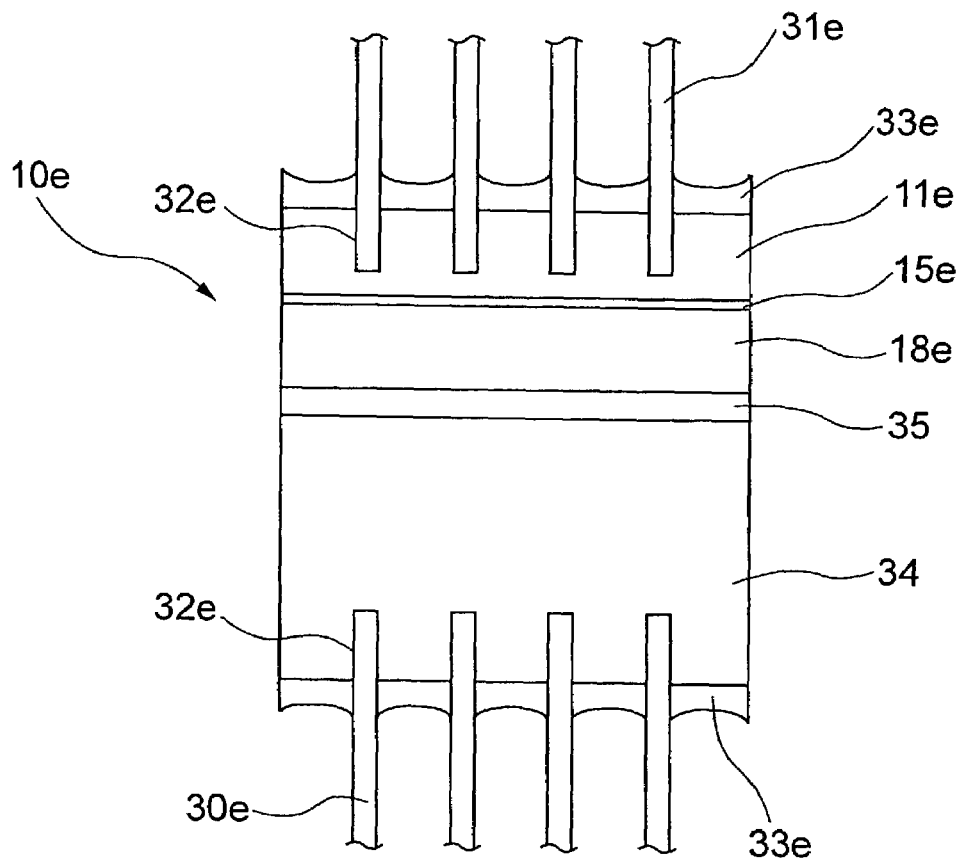
FIG. 17 is a sectional view of an optical device using a diffractive optical element according to a fifth embodiment of the present invention.

FIG. 17 is a sectional view of an optical device using a diffractive optical element according to a fifth embodiment of the present invention. In the case as described above, as shown in FIG. 17, an optical fiber holder 34 for holding optical fibers 30e for output is fixed to the output side of a diffractive optical element 10e by an adhesive 35.

The optical fiber holder 34 is formed by forming recesses 32e in a glass substrate or the like and then inserting the optical fibers 30e. This configuration can reduce labor of packaging the optical fibers, thus can be regarded as a modified embodiment of the present invention.

In each of the above described diffractive optical elements or each of the above described optical devices, a power of the incident light or the intensity of the diffracted light as an output may vary due to some causes that are difficult to control beforehand. For example, a temperature variation can change characteristics of a liquid crystal. A variation in mechanical load to an optical fiber can also cause such a detrimental effect. If a variation of the power is monitored and the voltage applied to the diffractive optical element is adjusted accordingly, there can be provided a diffractive optical element and an optical device using the same that do not depend on these variation factors.

Figure 18:
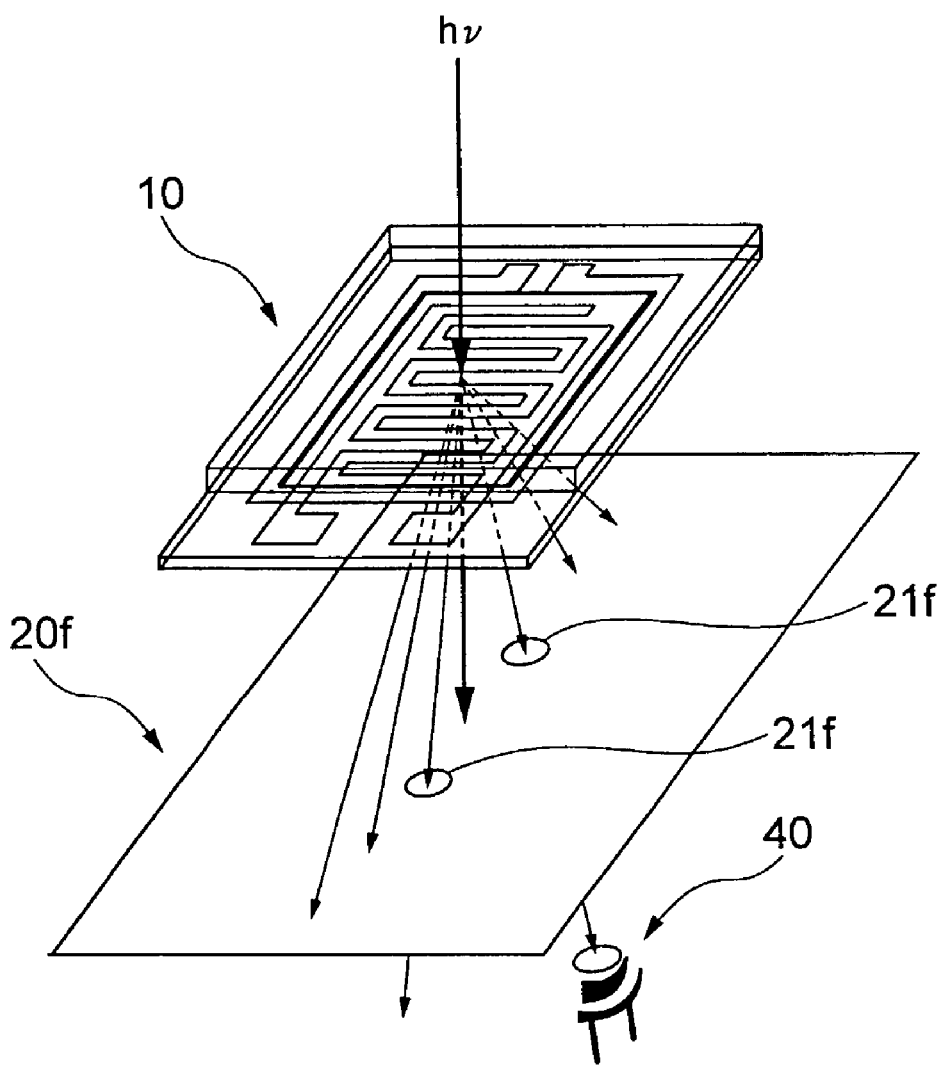
FIG. 18 is a perspective view showing a configuration and operation of an optical device using the diffractive optical element according to the first embodiment of the present invention.

FIG. 18 is a perspective view showing a configuration and operation of an optical device using the diffractive optical element 10 according to the first embodiment of the present invention. The optical device in FIG. 18 comprises the diffractive optical element 10, a stop 20f, and a power monitor 40. In this example, the stop 20f is used that is provided with openings 21f in positions where ±first order diffracted lights from the diffractive optical element 10 transmit. The optical device in FIG. 18 selects the ±first order diffracted lights having the same intensity as output.

The power monitor 40 including a photodetector such as a photodiode detects an intensity of, for example, the -first order diffracted light. The voltage applied to the diffractive optical element 10 is controlled all the time or at predetermined intervals according to the output of the power monitor 40. Stable operation of the optical device is provided by this control even when the diffracted light intensity varies for some reasons. Thus, there can be provided the diffractive optical element and the optical device using the same that are resistant to the external variation factors.

In FIG. 18, the stop 20f with the openings 21f is used. The same advantages as described before can be obtained in a configuration using optical parts such as optical fibers or mirrors instead of the stop 20f. Monitoring the same order diffracted lights with different signs is not always required. A relationship between the diffracted light intensity and the applied voltage is uniquely determined, so that other order diffracted lights may be monitored. Therefore, these configurations can be regarded as modified embodiments of the present invention.

In FIG. 18, the photodetector such as a discrete photodiode is used as the power monitor. If this is applied to the multi-channel diffractive optical element shown in FIG. 10, the discrete photodetectors as many as the diffractive optical elements (channels) are placed. Such an optical device normally operates and has no functional problems. But there are problems in a sense that assembly takes time because of the large number of components, and that costs of members increase. To solve these problems, optical detection means may be formed on the same substrate with the diffractive optical element by using a thin film semiconductor process.

Figure 19:
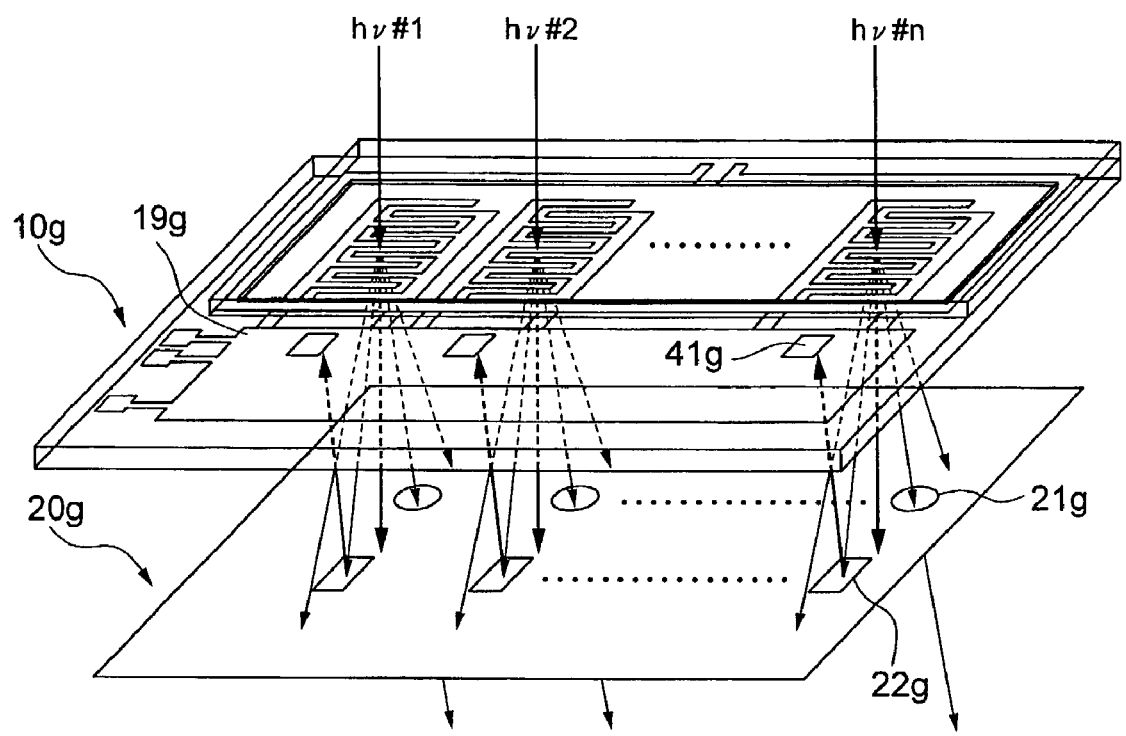
FIG. 19 is a perspective view showing a configuration and operation of an optical device using a diffractive optical element according to a sixth embodiment of the present invention.

FIG. 19 is a perspective view showing a configuration and operation of an optical device using a diffractive optical element according to a sixth embodiment of the present invention. In FIG. 19, a diffractive optical element 10g includes power monitors 41g in a TFT circuit 19g. A configuration of the TFT circuit 19g including the power monitors 41g will be described later.

A stop 20g having openings 21g and mirrors 22g is placed below the diffractive optical element 10g. At this time, the component elements are placed such that a diffracted light whose intensity is to be monitored is reflected by the mirror 22g and enters the power monitor 41g, and that a diffracted light to be output transmits the opening 21g.

Figure 20:
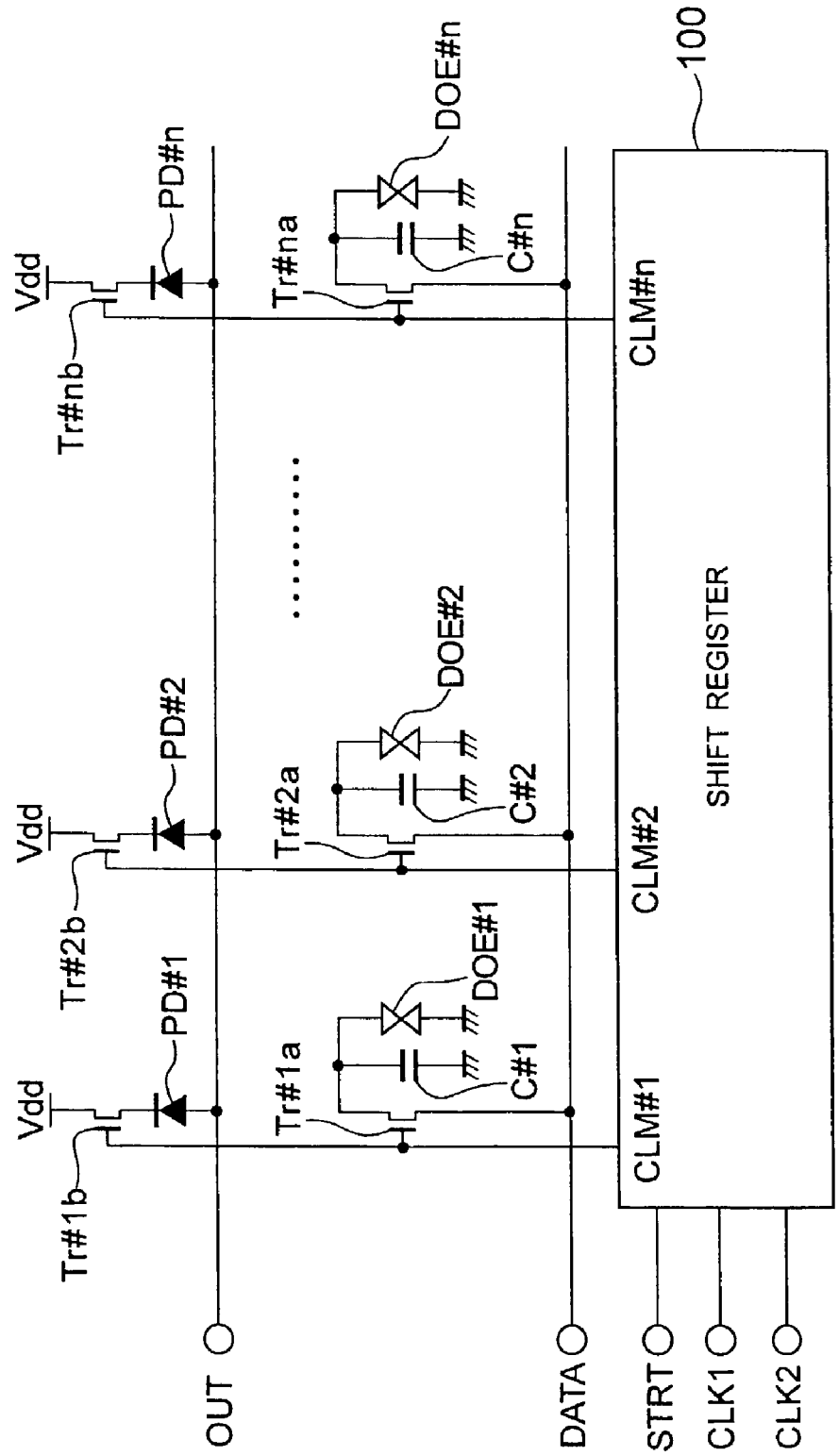
FIG. 20 is a circuit diagram showing a configuration of a TFT circuit of the optical device using the diffractive optical element according to the sixth embodiment of the present invention.

FIG. 20 is a circuit diagram showing a configuration of the TFT circuit of the optical device using the diffractive optical element according to the sixth embodiment of the present invention. In FIG. 20, a configuration of the TFT circuit 19g including the power monitors 41g is shown.

A difference between the TFT circuit 19g and the TFT circuit 19 in FIG. 12 is that the TFT circuit 19g has photodiodes PD#1, PD#2, . . . , pD#n that are the power monitors 41g, and thin film transistors Tr#1b, Tr#2b, . . . , Tr#nb for sending output of the photodiodes to an outside, corresponding to each diffractive optical element DOE.

Such a photodiode array is generally used in a contact image sensor using amorphous silicon (a-Si), and its manufacturing process is compatible with that of the thin film transistor. That is, the whole circuit components in FIG. 20 can be manufactured on a single transparent substrate by using the thin film semiconductor processes for poly-Si and a-Si.

To a gate electrode of a thin film transistor Tr#1a, and a gate electrode of a thin film transistor Tr#1b, the same output of a shift resister circuit 100 is connected. This configuration allows recording the voltage in the diffractive optical element DOE#1 and outputting detection results of the diffracted light intensity corresponding to the voltage value recorded before simultaneously. Sharing the shift resister circuit 100 can reduce a circuit scale, thereby allowing reduction in manufacturing costs of the element.

Also in the optical device in FIG. 19, various configurations described above are allowed such as using optical fibers or mirrors instead of the stop, or adopting the mounting manner shown in FIG. 15 or 16 when using the optical fiber. Therefore, these configurations can be regarded as modified embodiments of the present invention.

In the above described embodiments, the transparent electrodes included in the diffractive optical element have a pair of comb teeth shapes facing each other. In the embodiments, the diffraction angle is determined by the arrangement pitch of the transparent electrodes, and cannot be changed. This also applies to the conventional diffractive optical element having the uneven structure or the column bodies periodically arranged.

A seventh embodiment of the present invention provides a diffractive optical element that can electrically switch the diffraction angle.

Figure 21:
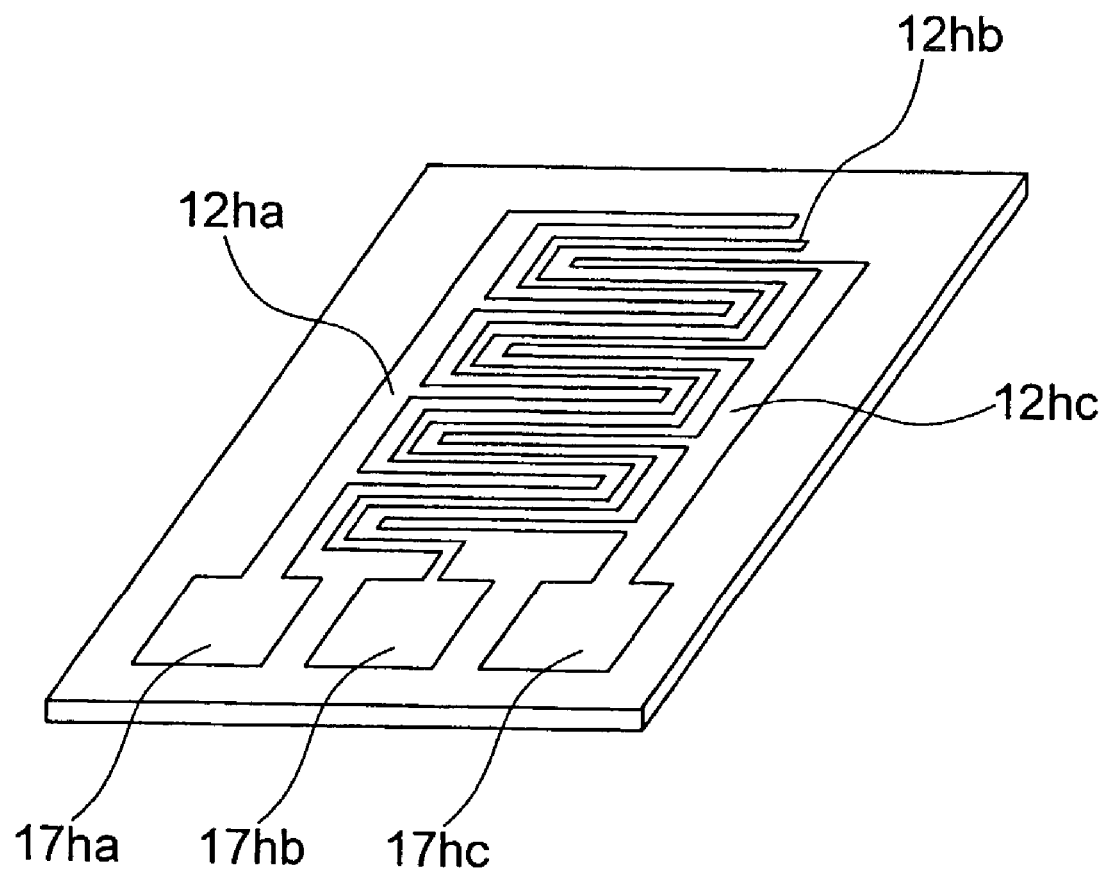
FIG. 21 is a partially perspective view showing a configuration of a diffractive optical element according to a seventh embodiment of the present invention.
Figure 22:
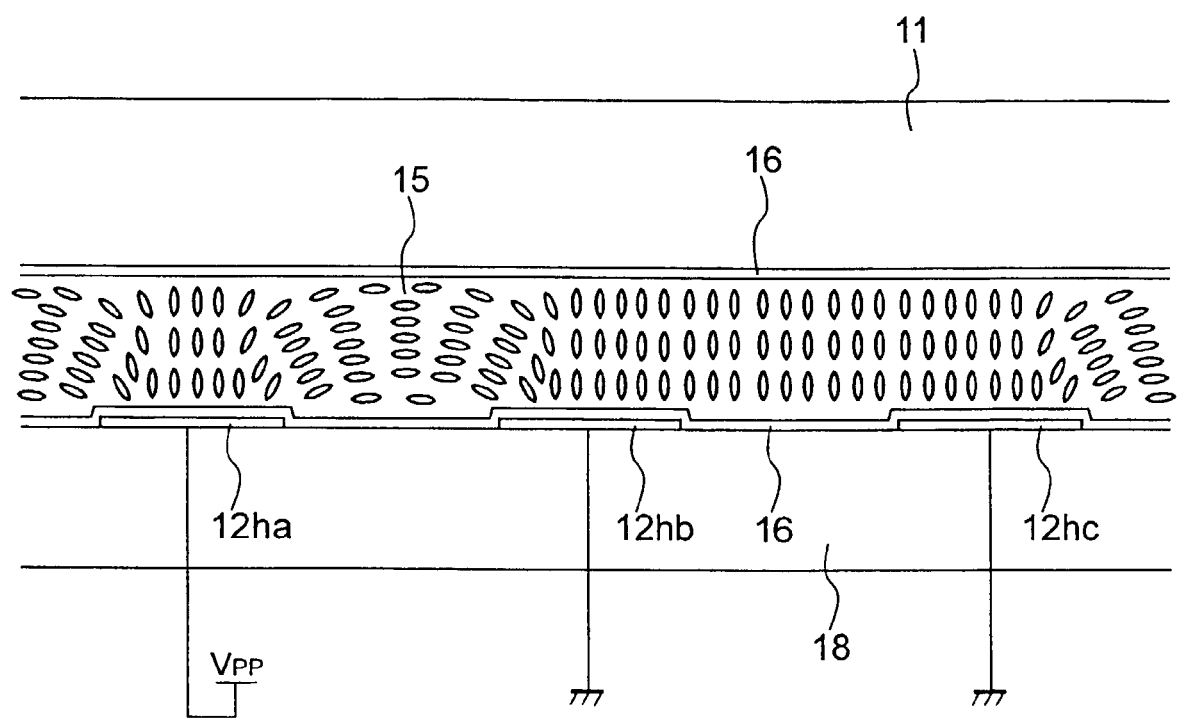
FIG. 22 is a sectional view for explaining an operating principle of the diffractive optical element according to the seventh embodiment of the present invention.
Figure 23:
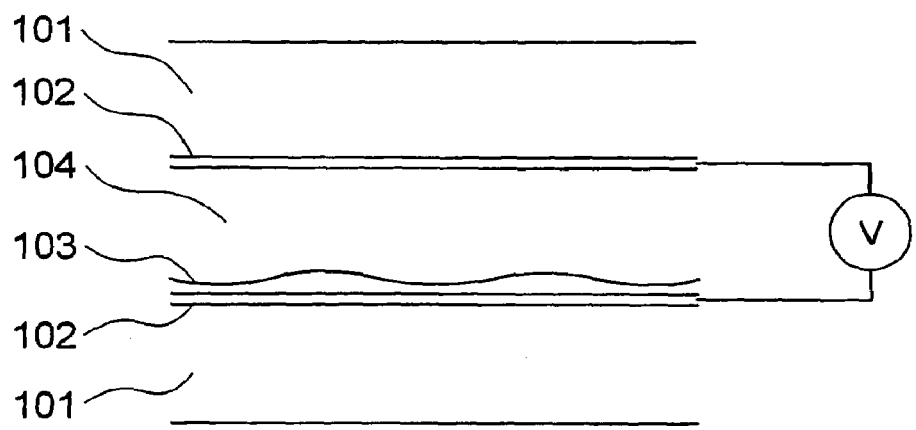
FIG. 23 is a sectional view showing a configuration of a conventional diffractive optical element.
Figure 24:
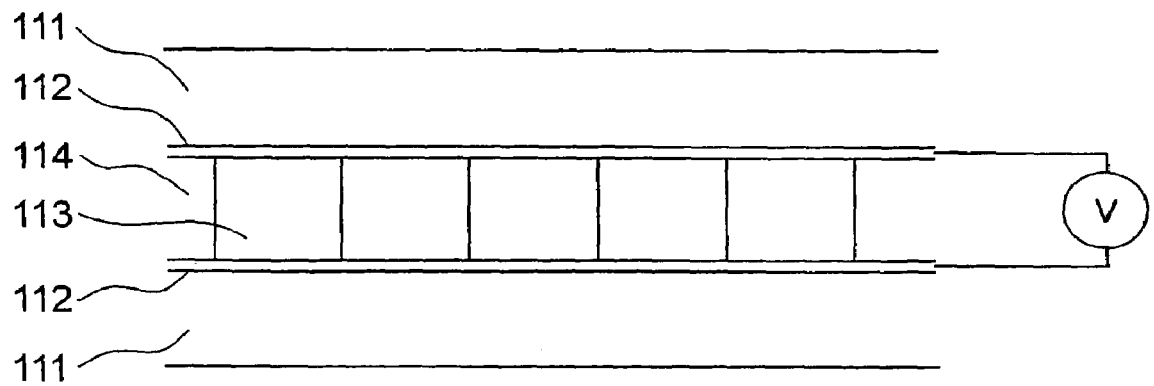
FIG. 24 is a sectional view showing a configuration of a conventional diffractive optical element.
Figure 25:
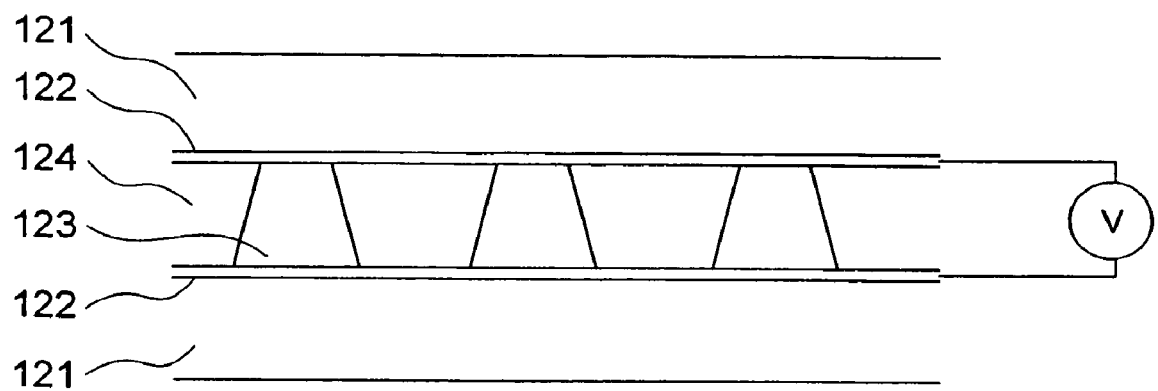
FIG. 25 is a sectional view showing a configuration of a conventional diffractive optical element.

FIG. 21 is a perspective view showing transparent electrodes of the diffractive optical element according to the seventh embodiment of the present invention, and FIG. 22 is a sectional view for explaining an operating principle of the diffractive optical element according to the seventh embodiment of the present invention. In FIG. 21, a third transparent electrode 12hb is placed between a pair of transparent interdigitated electrodes 12ha and 12hc facing each other. For setting potentials of the transparent electrodes 12ha, 12hb, and 12hc independently, pads 17ha, 17hb, and 17hc corresponding to the respective electrodes are provided. Here, the shape of the transparent electrode only is different, and other component elements included in the diffractive optical element are the same as the configuration in FIG. 1.

Next, operation of the seventh embodiment will be described. A case is considered where the transparent electrodes 12ha and 12hc are grounded, and the voltage is applied to the transparent electrode 12hb. Electric field distribution formed in the liquid crystal layer, that is, alignment of the liquid crystal molecules is the same as that in FIG. 2. Thus, the diffraction angle and the diffracted light intensity obtained at this time are completely the same as in the case for FIG. 2.

When the voltage is applied to the transparent electrode 12ha only, and the transparent electrodes 12hb and 12hc are grounded, the orientations of the liquid crystal molecules are schematically shown in FIG. 22. That is, there is an electric field between the transparent electrode 12ha and the adjacent transparent electrode 12hb, and the liquid crystal molecules are oriented along the electric field, while an electric field between the transparent electrodes 12hb and 12hc is zero, and the liquid crystal molecules remain vertically oriented. Thus, an alignment state of the liquid crystal molecules, that is, a phase delay of a light passing through the liquid crystal is repeated in a unit of arrangements of three transparent electrodes 12ha, 12hb, and 12hc.

On the other hand, a repeat unit in FIG. 2 is two transparent electrodes. The diffraction angle is substantially inversely proportional to an arrangement period of the liquid crystal molecules, so that the diffraction angle in FIG. 22 is about two-thirds of that in FIG. 2. Thus, the potentials of the transparent electrodes 12ha, 12hb, and 12hc are controlled to switch the diffraction angle.

FIGS. 22 and 2 show a distance between two adjacent transparent electrodes and a width of the transparent electrode as if both are the same, in consideration of correspondence to the above described manufacturing example. Actually, these are design parameters of a diffraction grating, and should be optimized in designing for obtaining a desired diffraction characteristic.

In the seventh embodiment of the present invention, the example is taken where the third transparent electrode 12hb is provided, and the diffraction angle is switched between the two angles depending on whether the voltage is applied or not to the transparent electrode 12hb. Various kinds of modification of this embodiment are allowed.

For example, adding fourth and fifth transparent electrodes, and providing control means for independently setting their potentials allow increase in the number of switchable diffraction angles.

In the seventh embodiment of the present invention, the plurality of transparent electrodes are provided on one transparent substrate only. If similar transparent electrodes are provided on the other transparent substrate to control their potentials, the alignment pattern of the liquid crystal molecules can be controlled more precisely. This requires labor of forming transparent electrodes on both transparent substrates, but has an advantage of the increased number of switchable diffraction angles.

The above described example is based on the spirit that the alignment pattern of the liquid crystal molecules is controlled by providing the plurality of transparent electrodes and controlling their potentials, thus this can be regarded as a modification of the seventh embodiment the present invention.

As described above, the diffractive optical element according to each embodiment of the present invention has described advantages below.

In the conventional diffractive optical element, the transparent electrodes are formed on both of the two transparent substrates, and the step of forming the periodic uneven structure or the transparent solid material, and the step of alignment treatment such as rubbing or oblique deposition are required, thus making it difficult to reduce manufacturing costs.

On the other hand, in each embodiment of the present invention, the electrode material may be formed on one transparent substrate only. There is no need for providing the substrate with the uneven structure or separating the liquid crystal layer by forming the column structures. Further, the rubbing is unnecessary. Such a simplified manufacturing process allows reduction in manufacturing costs of the diffractive optical element.

Since the diffractive optical element according to each embodiment of the present invention does not require the uneven structure of the substrate or the column structures, the proportion of the liquid crystal firmly anchored to the surface is smaller than the conventional structures. Therefore, it is easy to form a fine pitched periodic structure for increasing the diffraction angle.

That is, the configuration of each embodiment of the present invention facilitates increasing the diffraction angle compared to the conventional structure. When the diffraction optical element according to each embodiment of the present invention is applied to various optical devices, reduction in sizes of the devices is achieved.

In the second embodiment of the present invention, the patterns of the plurality of transparent electrodes are provided on the common transparent substrate, and the liquid crystal is injected and sealed. This allows diffractive optical elements to be arranged with a high density compared to the configuration having independent diffractive optical elements mounted. Therefore, reduction in sizes of various multi-channel optical devices is achieved. In addition, a manufacturing cost per channel can be reduced.

In the third embodiment of the present invention, forming a part of the control circuit on the same transparent substrate by the thin film transistors allows significant reduction in the number of electric connections to the external circuit, and reduction in the scale of the external integrated circuit. Therefore, sizes and costs of optical devices using the diffractive optical element according to the third embodiment can be reduced.

As shown in FIGS. 14 and 15, the diffractive optical element of the present invention can be used to configure various optical devices such as a variable optical attenuator, an optical switch, or a filter. The diffractive optical element of the present invention has the advantages as described above, thus the optical devices using the element allows reduction in size and manufacturing costs with relative ease.

In the fourth and fifth embodiment of the present invention, an optical fiber is inserted into the recess provided on the transparent substrate that is a component element of the diffractive optical element. Therefore, mounting the optical fiber is easy, and reduction in size and in assembly costs for the optical device is achieved.

In the optical device in FIG. 18 provided with means for detecting the diffracted light intensity, the voltage applied to the diffractive optical element is controlled all the time or at predetermined intervals according to the diffracted light intensity. Stable operation of the optical device is provided by the control even when the diffracted light intensity varies for some reasons. Thus, there can be provided the diffractive optical element and the optical device using the same that are resistant to external variation factors.

In the sixth embodiment of the present invention, optical detection means is formed on the same substrate with the diffractive optical element by using thin film semiconductor processes. Thus, there can be provided the diffractive optical element and the optical device using the same that are resistant to the external variation factors, without increasing the number of parts, costs of members, and labor of assembly.

In the seventh embodiment of the present invention, three or more transparent electrodes are provided, and their potentials are controlled, thereby allowing the diffraction angles to be switched.

As described above, the present invention provides the diffractive optical element having the liquid crystal layer sandwiched between the first transparent substrate and the second transparent substrate, wherein the plurality of transparent electrodes are provided on the surface facing the liquid crystal layer of at least one of the first transparent substrate and the second transparent substrate, and the potentials of the transparent electrodes are set by control means. Therefore, in the diffractive optical element of the present invention, simplification in the manufacturing process and reduction in manufacturing costs are achieved.

What is claimed is:

1. A diffractive optical element comprising:
   first and second transparent substrates;
   a liquid crystal layer sandwiched between said first transparent substrate and said second transparent substrate;
   three or more transparent electrodes provided on a surface facing said liquid crystal layer of at least one of said first transparent substrate and said second transparent substrate; and
   control means for controlling an electric field between an adjacent two of said three or more transparent electrodes.

2. The diffractive optical element according to claim 1, wherein said control means comprises a circuit formed on a surface facing said liquid crystal layer of at least one of said first transparent substrate and said second transparent substrate using thin film transistors.

3. The diffractive optical element according to claim 2, wherein said at least three transparent electrodes are interdigitated.

4. The diffractive optical element according to claim 1, wherein a diffracted light is extracted through an optical fiber inserted into a recess provided on a surface not facing said liquid crystal layer of said second transparent substrate.

5. The diffractive optical element according to claim 1, wherein fixing means for fixing an optical fiber is provided at a predetermined distance from the surface not facing said liquid crystal layer of said second transparent substrate, and a diffracted light is extracted through said optical fiber placed in said fixing means.

6. The diffractive optical element according to claim 1, further comprising power detecting means for detecting an intensity of a diffracted light of specific order.

7. The diffractive optical element according to claim 6, wherein said power detecting means is formed on a surface facing said liquid crystal layer of said second transparent substrate.

8. The diffractive optical element according to claim 1, wherein the liquid crystal is of a positive type and vertically oriented to each substrate.

9. An optical device, comprising:
   the diffractive optical element according to claim 1, and
   means for selecting a diffracted light of specific order of said diffractive optical element as output.

10. The optical device according to claim 9, wherein said means for selecting is any of a variable optical attenuator, a polarization separator, and an optical switch using said diffractive optical element.

11. The optical device according to claim 9, comprising an optical fiber for guiding an input light to said diffractive optical element, said optical fiber being inserted into a recess provided on a surface not facing said liquid crystal layer of said first transparent substrate.

12. The optical device according to claim 9, comprising power detecting means for detecting an intensity of the diffracted light of the specific order.

13. The optical device according to claim 12, wherein said power detecting means is formed on the surface not facing said liquid crystal layer of said second transparent substrate.

14. The optical device according to claim 9, wherein the liquid crystal is of a positive type and vertically oriented to each substrate.

15. An optical device, comprising the diffractive optical element according to claim 1, and wherein said control means is structured and arranged to diffract light and said optical device is structured and arranged to select a diffracted light of high order of said diffractive optical element as output.

16. The optical device according to claim 15, the device is any of a filter and an optical demultiplexer using said diffractive optical element.

17. The diffractive optical element according to claim 1, wherein said control means sets the potentials of said three or more transparent electrodes independently.

18. The diffractive optical element according to claim 1, wherein said three or more transparent electrodes include a pair of transparent interdigitated electrodes facing each other and at least one transparent electrode placed between said pair of transparent interdigitated electrodes.

* * * * *